United States Patent [19]
Aoki et al.

[11] Patent Number: 5,717,626
[45] Date of Patent: Feb. 10, 1998

[54] PHOTOELECTRIC SENSOR, INFORMATION RECORDING SYSTEM, AND INFORMATION RECORDING AND REPRODUCING METHOD

[75] Inventors: Daigo Aoki; Mitsuhiro Kashiwabara; Osamu Shimizu, all of Tokyo, Japan

[73] Assignee: Dai Nippon Printing Co., Ltd., Tokyo, Japan

[21] Appl. No.: 617,220

[22] Filed: Mar. 18, 1996

[30] Foreign Application Priority Data

Mar. 17, 1995 [JP] Japan ................... 7-059292
Jan. 9, 1996 [JP] Japan ................... 8-001693

[51] Int. Cl.$^6$ ................................. G11C 13/04
[52] U.S. Cl. ......................... 365/112; 365/110
[58] Field of Search ...................... 365/112, 110, 365/111, 109; 369/126, 283

[56] References Cited

U.S. PATENT DOCUMENTS 5,488,601  1/1996  Sakano et al. .................. 365/112

FOREIGN PATENT DOCUMENTS 0 422 238   4/1991  European Pat. Off.
0 454 869  11/1991  European Pat. Off. ......... G03G 5/02
0 595 255   5/1994  European Pat. Off. ......... H04N 5/30
0 622 708  11/1994  European Pat. Off. ......... G03G 15/22
0 622 954  11/1994  European Pat. Off. ......... H04N 5/30

OTHER PUBLICATIONS

Patent Abstracts of Japan, Pub. No. JP 5061216 (Mar. 12, 1993), vol. 17, No. 372 (Jul. 13, 1993).
Patent Abstracts of Japan, Pub. No. JP 5061217 (Mar. 12, 1993), vol. 17, No. 372 (Jul. 13, 1993).
Patent Abstracts of Japan, Pub. No. JP 4282349 (Oct. 7, 1992), vol. 17, No. 86 (Feb. 19, 1993).
Patent Abstracts of Japan, Pub. No. JP 4046348 (Feb. 17, 1992), vol. 16, No. 222 (May 25, 1992).
Patent Abstracts of Japan, Pub. No. JP 4046349 (Feb. 17, 1992), vol. 16, No. 222 (May 25, 1992).
Patent Abstracts of Japan, Pub. No. JP 4046351 (Feb. 17, 1992), vol. 16, No. 222 (May 25, 1992).
Patent Abstracts of Japan, Pub. No. JP 61011751 (Jan. 20, 1986), vol. 10, No. 157 (Jun. 6, 1986).

*Primary Examiner*—Tan T. Nguyen
*Attorney, Agent, or Firm*—Morgan & Finnegan, LLP

[57] ABSTRACT

In a photoelectric sensor that enables information to be recorded on an information recording medium at an intensity amplified to a level higher than that of a current induced by information exposure and allows conductivity to remain maintained by a continued application of voltage even after termination of the information exposure, so that information can subsequently be recorded on the information recording medium, a photoconductive layer contains a substance that emits fluorescence in a wavelength region in which a charge generation substance-containing layer absorbs light, so that color images can be well recorded on the information recording medium. Also provided is an information recording system using such a photoelectric sensor.

72 Claims, 11 Drawing Sheets

PHOTOELECTRIC SENSOR, INFORMATION RECORDING SYSTEM, AND INFORMATION RECORDING AND REPRODUCING METHOD

BACKGROUND OF THE INVENTION

The present invention relates to a photoelectric sensor capable of recording light information on an information recording medium in the form of visible information or electrostatic information. More specifically, the present invention relates to a photoelectric sensor having on an electrode a photo-induced current amplifying layer which has photo-induced current amplifying action and/or injection current stabilizing action. The present invention also relates to an information recording system including the photoelectric sensor and an information recording medium, and to an information recording and reproducing method which employs the information recording system. More particularly, the present invention relates to an information recording system including a photoelectric sensor having a photo-induced current amplifying layer that markedly amplifies the information recording performance with respect to an information recording medium, thereby making it possible to obtain a predetermined image density and eliminate unevenness of the recorded image and generation of image noise, and also relates to an information recording and reproducing method which employs the information recording system.

There has heretofore been an information recording and reproducing method in which a photoelectric sensor having a photoconductive layer provided with an electrode on the front side thereof is disposed to face, on an optical axis, an information recording medium having an electric charge retaining layer provided with an electrode on the rear side thereof, and exposure is carried out with a voltage being applied between the two electrodes, thereby enabling electrostatic charge corresponding to the incident optical image to be recorded on the electric charge retaining layer, and then the recorded electrostatic information is reproduced by toner development or electric potential reading method, as described, for example, in Japanese Patent Application Laid-Open (KOKAI) JP01290366(A) and JP01289975(A). There is another conventional information recording and reproducing method in which the electric charge retaining layer in the above-described method is replaced by a thermoplastic resin layer, and after electrostatic charge has been recorded on the surface of the thermoplastic resin layer, heating is carried out to form a frost image on the surface of the thermoplastic resin layer, thereby making the recorded electrostatic charge visible, as described, for example, in Japanese Patent Application Laid-Open (KOKAI) JP03192288(A).

The present applicants have developed an information recording and reproducing method in which the information recording layer of the above-described information recording medium is a polymer dispersed liquid crystal layer, and in which exposure is carried out under voltage application in the same way as the above, and the molecules in the liquid crystal layer are aligned by an electric field formed by a photoelectric sensor, thereby effecting information recording, and the recorded information is reproduced as visible information by transmitted or reflected light. With regard to the information recording and reproducing method, we have filed as Japanese Patent Application Nos. 04-3394, 04-24722(JP06130347(A)) and 05-266646. This method enables the recorded information to be made visible without using a polarized light plate.

For photoelectric sensors available for the above-mentioned information recording and reproducing method, the applicants have filed Japanese Patent Application No. 6-6437 to propose a photoelectric sensor which is semiconductive and has such a function that when a voltage is applied between the electrode of the photoelectric sensor and an electrode of an information recording medium while information exposure is being carried out, or when information exposure is carried out with a voltage being applied between the two electrodes, information can be recorded on the information recording medium with an electric current amplified to a level higher than the intensity of a photoelectric current induced by the information exposure, and that even after termination of the information exposure, when the voltage is continuously applied, the photoelectric sensor shows moderately decaying conductivity so that the recording of information on the information recording medium can subsequently be continued. Furthermore, the applicants have filed anther Japanese Patent Application No. 6-84640 to propose a photoelectric sensor similar to that mentioned just above in which, in addition to charge generation and transport layers, a photo-induced current amplifying layer having action on amplifying the photo-induced current or stabilizing the injected current is stacked in place.

However, a problem associated with recording color images using these systems is that the sensitivity to colors is greatly governed by the spectral sensitivity of the photoelectric sensor; no satisfactory results are achievable in view of color balance because the photoelectric sensor is somewhat less sensitive to blue. Thus, there is a great demand for a photoelectric sensor which is well applicable to such information recording methods with an improved sensitivity to blue and in a state well-balanced among RGB colors.

Objects of the present invention are to provide a photoelectric sensor which can be used to form information on an information recording medium and is excellent in the ability to form images as well as in sensitivity to recording information so that images well-balanced among colors can be obtained, an information recording system, and an information recording and reproducing method.

SUMMARY OF THE INVENTION

The present invention provides a photoelectric sensor having a photoconductive layer on an electrode and used to form information on an information recording medium.

The photoelectric sensor in which a photoconductive layer defined by a charge generation layer and a charge transport layer or a photoconductive layer comprising a mixture of a charge generation substance and a charge transport substance is stacked on an electrode, characterized in that said photoconductive layer contains a fluorescent substance which emits fluorescence in a wavelength region in which said charge generation substance-containing layer absorbs light.

IN addition, the present invention provides a photoelectric sensor having a photoconductive layer on an electrode and used to form information on an information recording medium, said photoelectric sensor being semiconductive and having such a function that when a voltage is applied between the electrode of said photoelectric sensor and an electrode of said information recording medium while information exposure is being carried out, or when information exposure is carried out with a voltage being applied between the two electrodes, information can be recorded on said information recording medium with an electric current amplified to a level higher than an intensity of a photoelectric current induced by the information exposure, and that even after termination of the information exposure, when the voltage is continuously applied, said photoelectric sensor shows moderately decaying electrical conductivity and continuously effects information recording to said information recording medium, characterized in that said photoconductive layer contains a fluorescent substance which emits fluorescence in a wavelength region in which said charge generation substance-containing layer absorbs light.

In addition, the present invention provides a photoelectric sensor having a photoconductive layer on an electrode and used to form information on an information recording medium having an information recording layer stacked on an electrode so that information can be formed on said information recording layer by an electric field for a quantity of electric charges given thereto from said photoelectric sensor disposed to face said information recording medium, said photoelectric sensor being semiconductive and having such a function that when a voltage is applied between the electrode of said photoelectric sensor and an electrode of said information recording medium while information exposure is being carried out, or when information exposure is carried out with a voltage being applied between the two electrodes, the electric field or the quantity of electric charged given thereto is amplified, and that even after termination of the information exposure, when the voltage is continuously applied, said photoelectric sensor shows moderately decaying electrical conductivity so that the electric field or the quantity of electric charge can subsequently be continuously imparted to said information recording medium, characterized in that said photoconductive layer contains a fluorescent substance which emits fluorescence in a wavelength region in which said charge generation substance-containing layer absorbs light.

The photoelectric sensor may have fluorescent substance having a maximum absorption wavelength in the range of 370 nm to 450 nm, absorbs mainly light lying in the wavelength range of 350 nm to 500 nm, has a maximum fluorescence-emitting wavelength in the range of 470 nm to 550 nm, emits fluorescence in the range of 450 nm to 600 nm, and has action on sensitizing fluorescence.

The fluorescent substance may be a charge transport substance.

Preferably, the photoelectric sensor having an application of electric field strength of $10^5$ to $10^6$ V/cm to said photoelectric sensor, a current passing through an unexposed portion has a density of $10^{-4}$ to $10^{-7}$ A/cm$^2$.

In addition, the present invention provides an information recording system for recording light information on an information recording medium by information exposure, said system being characterized by comprising a said a photoelectric sensor, and the information recording medium having an information recording layer formed on an electrode, above-described photoelectric sensor and said information recording medium being disposed on an optical axis to face each other with a gap located therebetween, so that exposure to light can be carried out from the photoelectric sensor side of an electrical connection can be made between the electrode of said photoelectric sensor and the electrode of said information recording medium so as to apply a voltage therebetween.

Preferably, said information recording layer comprises a liquid crystal phase and a resin phase.

In addition, the present invention provides the information recording system that said information recording layer comprises a thermoplastic resin, and is heated after charges corresponding to information exposure have been imparted to a surface thereof, thereby forming a frost image corresponding to the information exposure on the surface of said information recording layer.

In addition, the present invention provides the information recording system that said information recording layer is a charge retaining layer, so that charges corresponding to information exposure are imparted to and formed on a surface of said information recording layer, or the charges formed on the surface of said information recording layer are developed with a toner.

Preferably, said information recording layer has memory properties.

In addition, the present invention provides the information recording system for recording light information on an information recording medium by information exposure, said system being characterized by comprising said photoelectric sensor, and the information recording medium having an information recording layer formed on an electrode, above-described photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω c.m.

In addition, the present invention provides the information recording system including a photoconductive layer, a dielectric layer, an information recording layer and an upper electrode stacked on a lower electrode in the described order, characterized in that a photoelectric sensor part including said lower electrode and said photoconductive layer comprises said photoelectric sensor, so that said information recording layer can be exposed to light through said photoelectric sensor part, and an electrical connection is made between said lower and upper electrodes so that a voltage can be applied therebetween.

Preferably, the information recording layer comprises a liquid crystal phase and a resin phase.

In addition, the present invention provides the information recording and reproducing method wherein light information is recorded on an information recording medium by information exposure, said method being characterized by comprising: using above-described photoelectric sensor, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

In addition, the present invention provides the information recording and reproducing method wherein light information is recorded on an information recording medium by information exposure, said method being characterized by using above-described photoelectric sensor and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

In addition, the present invention provides the information recording and reproducing method wherein light information is recorded on an information recording medium by information exposure, said method being characterized by using said photoelectric sensor and the information recording medium including a charge retaining layer on an electrode, imparting charges onto said information recording layer by light information exposure, and reading and reproducing the thus recorded light information with an electrical potential sensor.

In addition, the present invention provides the information recording and reproducing method wherein light information is recorded on an information recording medium by information exposure, said method being characterized by using above-described photoelectric sensor and the information recording medium including surface of said information recording layer, or the charges formed on the surface of said information recording layer are developed with a toner charge retaining layer on an electrode, imparting charges onto said information recording layer by light information exposure, and developing the thus recorded light information with a toner to reproduce said information as visible information by transmitted or reflected light.

In addition, the present invention provides the information recording and reproducing method wherein light information is recorded on an information recording medium by information exposure, said method being characterized in that said information recording medium includes a photoconductive layer, a dielectric layer, an information recording layer and an upper electrode stacked on a lower electrode in the described order; a photoelectric sensor part including said lower electrode and said photoconductive layer comprises above-described photoelectric sensor; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

DESCRIPTION OF THE PREFERRED EMBODIMENTS

The present invention will be described below in detail.

The photoelectric sensor of the present invention, which used in an information recording system, has a photo-induced currently amplifying layer and a photoconductive layer stacked on an electrode. The photoconductive layer may have a single-layer structure or a double-layered structure including a charge generation layer and a charge transport layer, which are stacked one on top of another. The photoconductive layer generally functions such that when it is irradiated with light, photo-induced charge carriers (electrons or holes) are generated in the irradiated portion and these carriers are movable across the width of the layer. These characteristics are particularly remarkable when the electric field exists.

Figure 21:
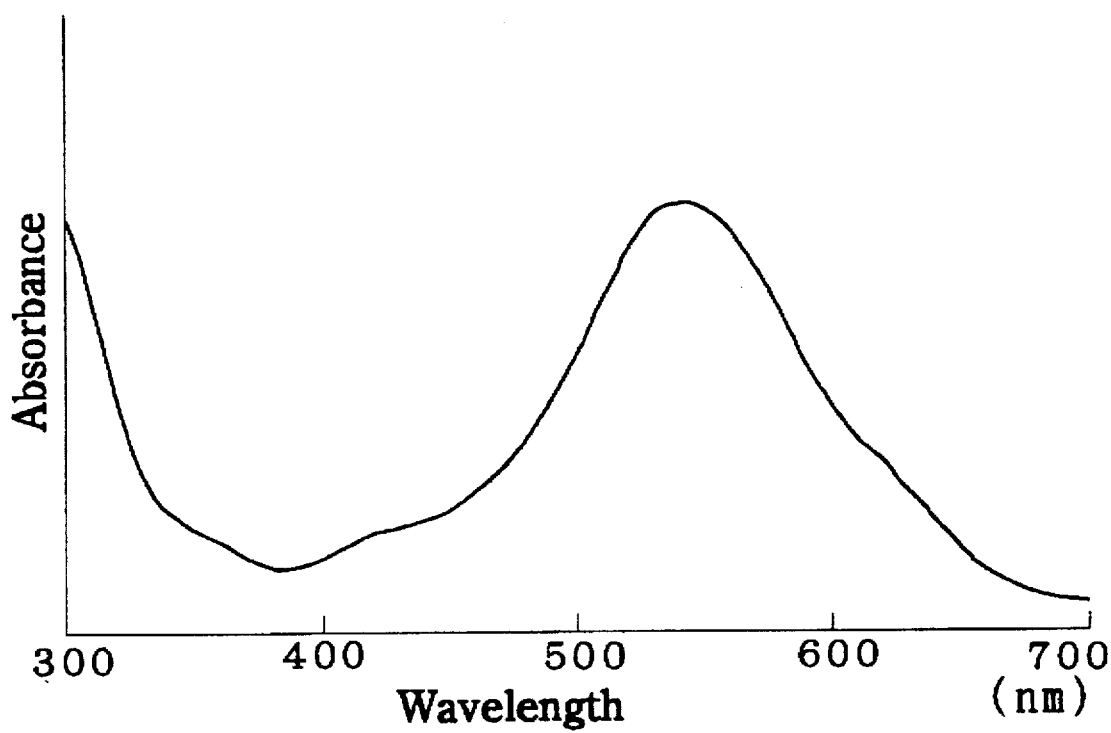
FIG. 21 is a view that illustrates absorption spectra of the charge generation layer.

In view of the color balance, it is here preferable that the photoelectric sensor used for recording color image information on the information recording medium according to the present invention be of uniform sensitivity to wavelengths lying in the visible light region of 400 to 700 nm. However, the spectroscopic characteristics of the photoelectric sensor is governed by those of the charge generation substance contained in such a photoconductive layer as depicted in FIG. 21, and so the photoelectric sensor is generally low in terms of the sensitivity to the blue wavelength region. It is thus difficult to obtain images well-balanced among colors.

To eliminate this difficulty, a fluorescent substance is incorporated in the photoconductive layer, said fluorescent substance having a maximum absorption wavelength in the range of 370 nm to 450 nm, absorbing mainly light lying in the wavelength range of 350 nm to 500 nm, having a maximum fluorescence wavelength in the range of 470 nm to 550 nm, and emitting fluorescence in the range of 450 nm to 600 nm.

This makes it possible to sufficiently absorb even the light of 400 nm to 510 nm which is less sensitive to and absorbed by the charge generation layer and lies in the blue wavelength region, and allow it to be emitted in the form of fluorescence (of 470 nm to 600 nm) which is of high sensitivity and lies in the green wavelength region. Thus, the light lying in the blue wavelength region is absorbed in the charge generation substance in the form of light lying in the green wavelength region, resulting an increase of the sensitivity to the blue wavelength region.

Figure 23:
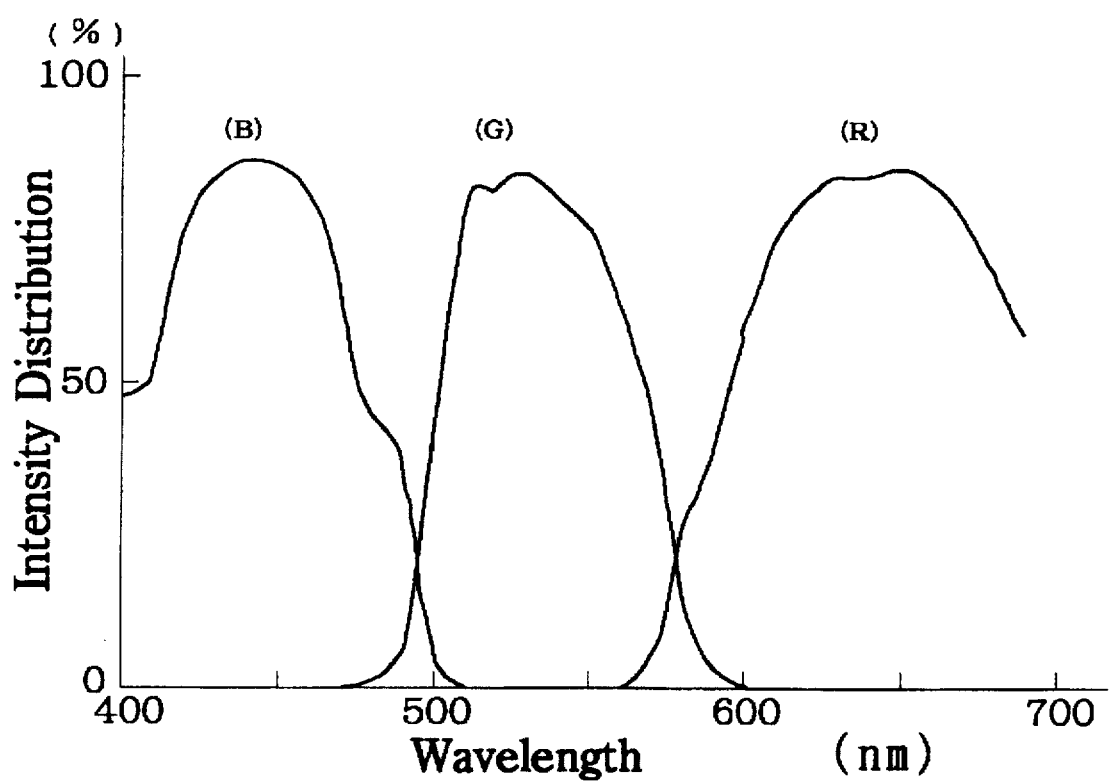
FIG. 23 is a view that illustrates the distribution characteristics of the RGB wavelength regions.

These characteristics are particularly effective for recording color images using such a tricolor separation prism as will be described later. That is, incident light is recorded on the information recording medium while it is separated into such RGB wavelength regions as depicted in FIG. 23, i.e., the blue, green and red regions of 400 to 510 nm, 470 to 600 nm and 560 to 700 nm, respectively. Thus, separately distinctive effects are expected for those wavelength regions; the blue region alone is subjected to the amplifying action, so that the color balance can be much more improved.

In addition, the photoelectric sensor of the present invention is such that the electric field or the quantity of charges imparted to the information recording medium is amplified with time during irradiated with light, and that even after termination of irradiation with light, the thus increased conductivity is moderately maintained by a continued application of voltage, so that the electric field or the quantity of charges can subsequently be applied to the information recording medium. A detailed account will now be given of the action on amplifying the photo-induced current in the photoelectric sensor according to the present invention.

The photoelectric sensor of the present invention will be explained below. A photoelectric sensor having an ITO electrode provided on a transparent glass substrate and a photoconductive layer stacked on the electrode is prepared as a photoelectric sensor for measuring the amplifying action, and a gold electrode of 0.16 cm² is stacked on the photoconductive layer. Then, a predetermined DC voltage is applied between the two electrodes with the ITO electrode used as a positive electrode. In addition, 0.5 sec. after the initiation of the voltage application, the photoelectric sensor is irradiated with light for 0.033 sec. from the substrate side.

Figure 3:
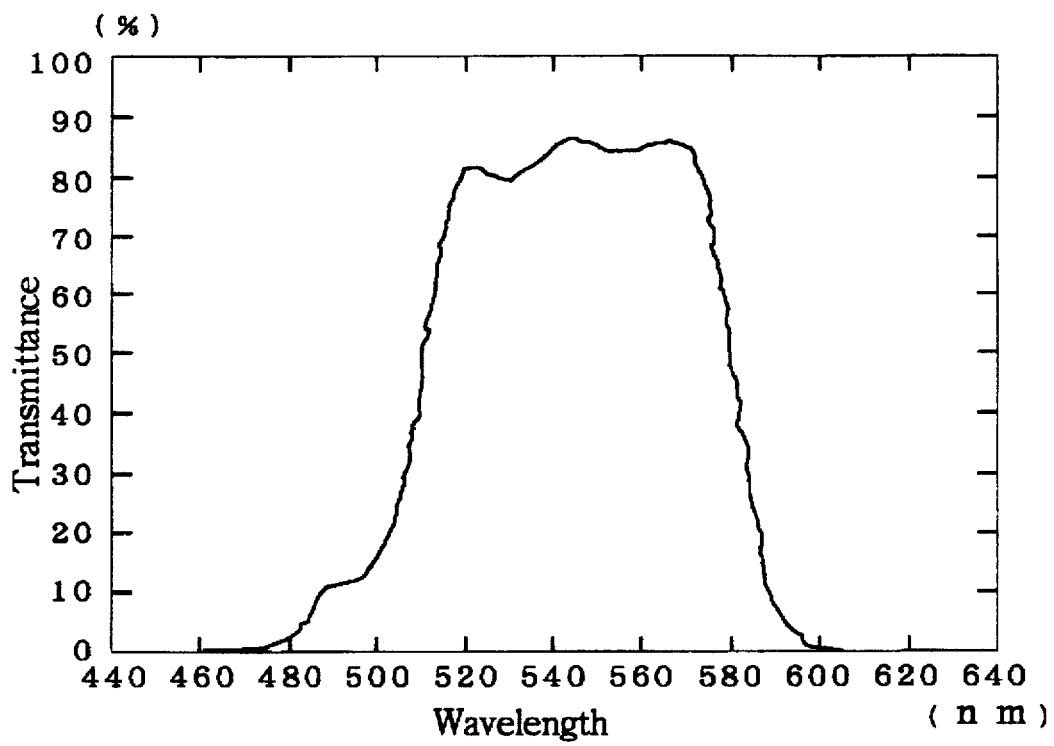
FIG. 3 is a view that illustrates the characteristics of a filter used for the measurement of the photoelectric sensor according to the present invention.

The behavior of the current flowing in the photoelectric sensor during the time of measurement is measured from the time (t=0) of initiation of the light irradiation. It should be noted that as the light for irradiation, green light was selected from light emitted from a xenon lamp (L2274, manufactured by Hamamatsu Photonics K.K.) as a light source by using a green filter (manufactured by Vacuum Optics Co. of Japan) and applied at a luminous intensity of 20 lux. The intensity of light was measured with an illuminometer (manufactured by Minolta Camera Co., Ltd.) FIG. 3 shows the characteristics of the filter used.

When the photoelectric sensor is irradiated with light having the above-described intensity, $4.2\times10^{11}$ photons/cm² sec. are incident on the photoconductive layer, considering the light transmittance of the transparent substrate and the ITO film and the special characteristics of the filter. If all the incident photons are converted into photocarriers, a photocurrent of $1.35\times10^{-5}$ A/cm² (per unit area) is generated in theory.

When measurement is carried out with the above-described measuring system, the ratio of the photo-induced current actually generated in the photosensitive sensor to the theoretical photocurrent is defined as the quantum efficiency of the photoelectric sensor:

Quantum efficiency=photo-induced current actually generated in the photoelectric sensor/theoretical photocurrent The term "photo-induced current" is employed herein to mean what is obtained by subtracting the value of base current, which is a current flowing through a portion irradiated with no light, from the value of current flowing through a portion irradiated with light. Therefore, the photo-induced current is not so-called photocurrent but a current which flows due to light irradiation in excess of the base current during the light irradiation or even after the light irradiation. The photo-induced current amplifying action in the photoelectric sensor of the present invention is defined as the behavior of such photo-induced current.

Figure 4:
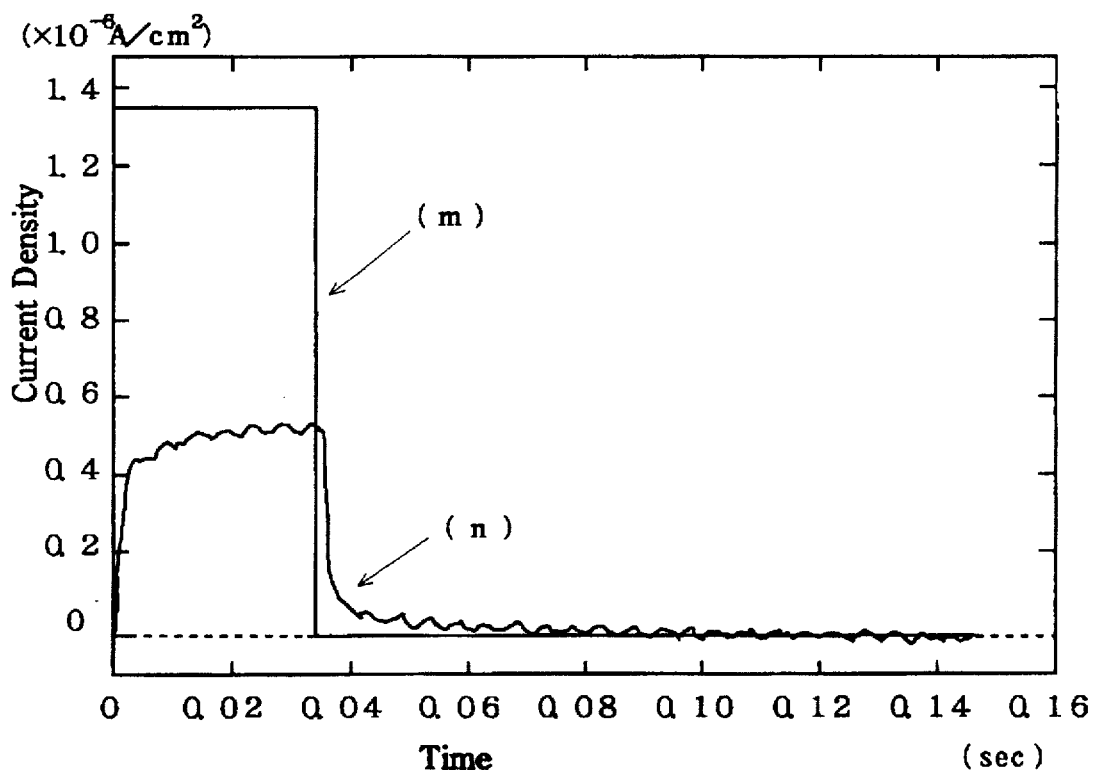
FIG. 4 is a view that illustrates the characteristics of the inventive photoelectric sensor having a photoelectric current-amplifying action and a photoelectric sensor having no such action.
Figure 5:
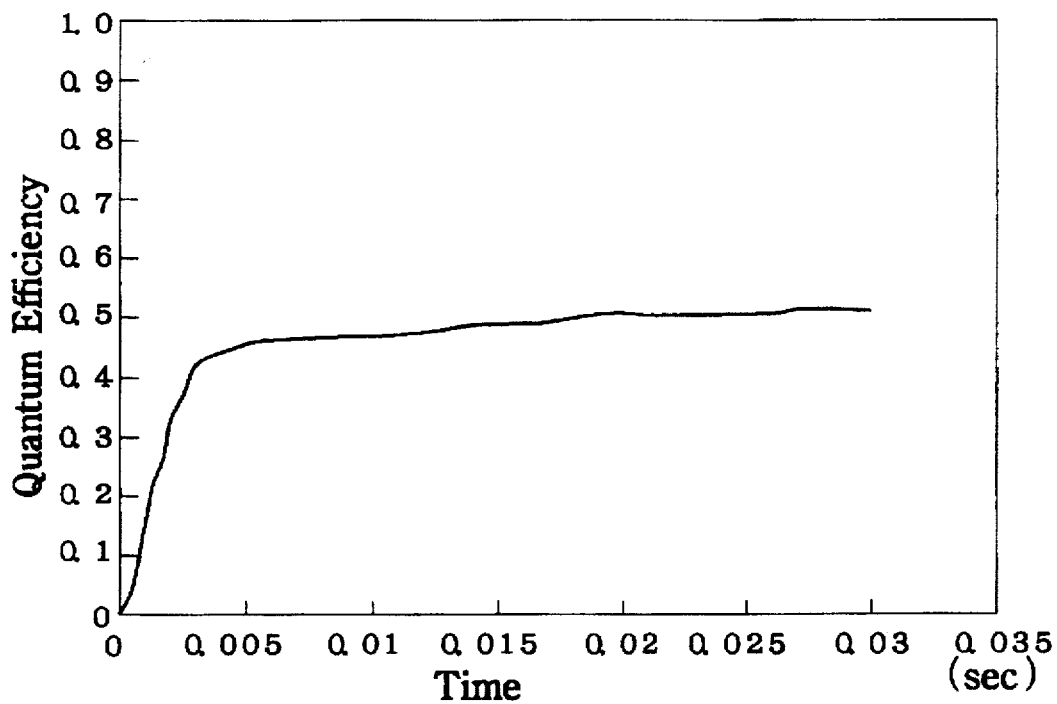
FIG. 5 is a view that illustrates how the quantum effect of the photoelectric sensor having no amplifying action changes during irradiated with light.

The photoelectric sensor including a photo-induced current amplifying layer having photo-induced current amplifying action according to the present invention and a photoelectric sensor (hereinafter referred to as "comparative sensor") having no photo-induced current amplifying layer will be explained below by using the results of measurement carried out with the above-described measuring system. First, the results of measurement with regard to the comparative sensor are shown in FIG. 4. In FIG. 4, the line m is a reference line indicating the above-described theoretical value ($1.35\times10{-6}$ A/cm²). The line m shows a state wherein light irradiation is effected for 0.033 sec. and the voltage application is continued even after the termination of the light irradiation. The line n shows the current measured in the photoelectric sensor having no photo-induced current amplifying layer. It will be understood from the line n that the increase of the photocurrent is small during the light irradiation and the value does not exceed the theoretical value ($1.35\times10^{-6}$ A/cm²). The quantum efficiency of the comparative sensor is only about 0.5 at the highest. FIG. 5 shows the change of the quantum efficiency during the light irradiation.

Figure 6:
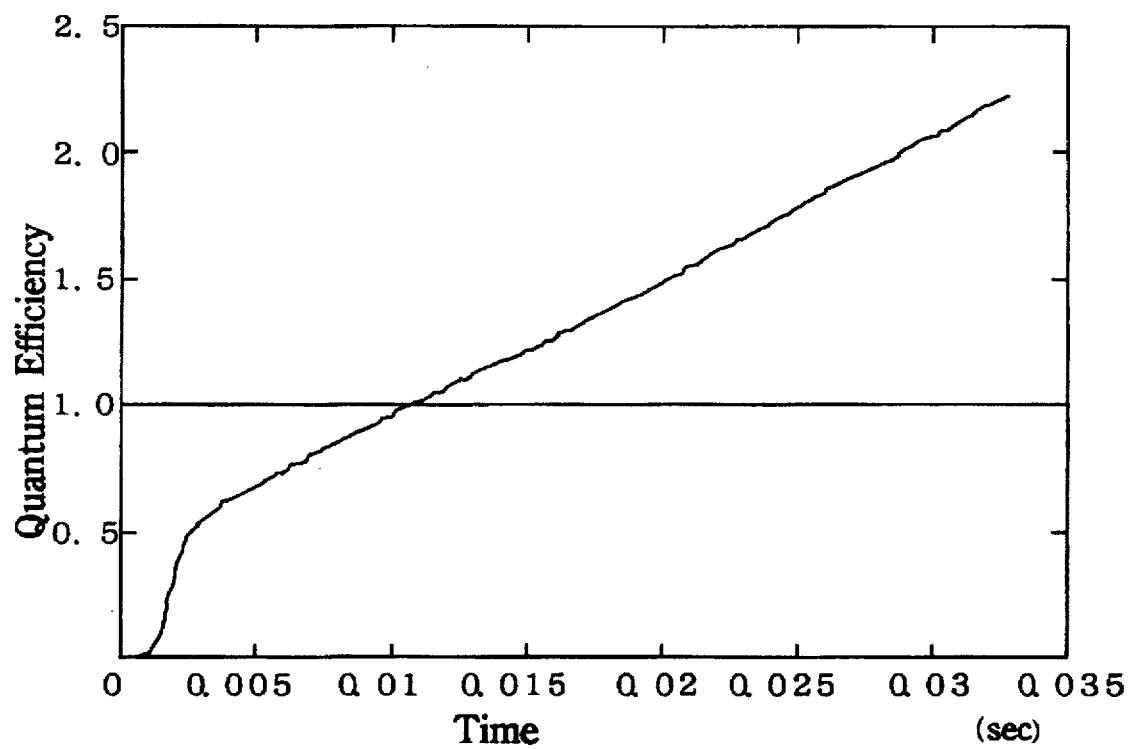
FIG. 6 is a view that illustrates how the quantum effect of the photoelectric sensor having an amplifying action changes during irradiated with light.
Figure 13:
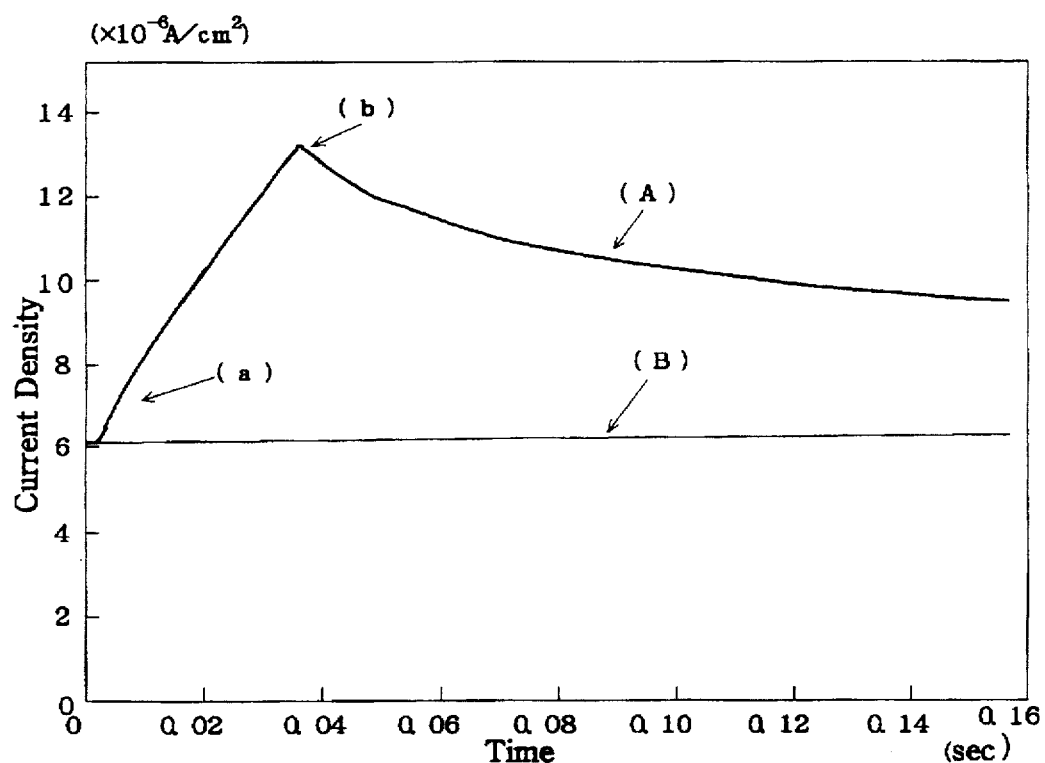
FIG. 13 is a view that illustrates the characteristics of one embodiment of the photoelectric sensor according to the present invention.

In contrast, in the photoelectric sensor of the present invention the photo-induced current increases during the light irradiation, as shown, for example, in FIG. 13, and as will be clear from FIG. 6, which shows the relationship between the quantum efficiency and time, the quantum efficiency exceeds 1 about 0.003 sec. after the initiation of the light irradiation, and it still continues increasing thereafter. That is, the provision of the photo-induced current amplifying layer makes it possible to obtain a much higher amplification factor than in the case of a photo-induced current condition which is usually attainable with a photoelectric sensor having no photo-induced current amplifying layer.

In the comparative sensor, the photocurrent decays rapidly at the same time as the light irradiation terminates. Therefore, no current effective as light information can be obtained even when the voltage application is continued after the termination of the light irradiation. On the other hand, in the photoelectric sensor of the present invention, the photo-induced currently continuously flows when the voltage application is continued even after the termination of the light irradiation. Thus, the photo-induced current can be continuously taken out, and light information can be continuously obtained.

Although the reason for the above is not clear, it is considered that in the photoelectric sensor of the present invention all photo-induced charge carriers generated as a result of the irradiation with information light do not move in the direction of the width of the photoconductive layer under the voltage application condition, but some photo-induced charge carriers are trapped in trap sites present in the photoconductive layer or in the extremely thin photo-induced current amplifying layer present between the electrode and the photoconductive layer, and trapped carriers are accumulated with time, sot hat under the voltage application condition, charge carriers injected from the electrode are induced to flow as a current by the trapped carriers in addition to the photocurrent generated by exposure, thus amplifying the apparent photo-induced current with time. Thus, by providing such a photo-induced current amplifying layer in the photoelectric sensor, photo-induced current amplifying action can be effectively produced. It is further surmised that when exposure is terminated with the voltage application condition maintained, photocarriers generated by the exposure immediately decay and disappear, but the decay of the trapped carriers is moderate, and hence the current of charge carriers injected from the electrode, which is induced by the trapped carriers, flow in a sufficient amount although it decays. The phenomenon that the electrical conductivity gradually decays is referred to as "moderately decaying electrical conductivity". The photo-induced current is the advantageous result obtained by the current amplification, which is triggered by light, in the photoelectric sensor of the present invention. Since a photocurrent larger than the photocurrent generated by incident light, which is expected from an ordinary photosensitive member, flows by virtue of the amplifying action, light information can be effectively supplied to an information recording medium.

Next, the injection current stabilizing action taking place in the photoelectric sensor of the present invention will be explained.

The injection current stabilizing action includes two actions, that is, the action of controlling the amount of charge carrier injected, and the action of uniforming the injection of carriers. First, the injection control action will be explained.

The photoelectric sensor of the present invention is a semiconductive device whose resistivity in dark is preferably in the range of $10^9$ ohm.cm to $10^{13}$ ohm.cm from the viewpoint of the density of current flowing. When the resistivity is in the range of $10^{10}$ ohm.cm to $10^{11}$ ohm.cm, a particularly remarkable amplifying action is obtained. A photoelectric sensor having a resistivity more than $10^{18}$ ohm.cm shows not amplifying action as occurs in the photoelectric sensor of the present invention in the field intensity range of $10^5$ V/cm to $10^6$ v/cm. In a photoelectric sensor having a resistivity less than $10^9$ ohm.cm, an exceedingly large current flows, so that noise is likely to occur due to the current. Therefore, such a photoelectric sensor is unfavorable.

By providing the photo-induced current amplifying layer, the amount of charge carrier injected from the electrode can be controlled so that the overall electrical conductivity of the photoelectric sensor is set at a favorable level. Thus, it is possible to obtain a photoelectric sensor having considerably excellent amplifying characteristics.

On the other hand, photosensitive devices employed for general electrophotography have a dark resistivity in the range of $10^{14}$ ohm.cm to $10^{16}$ ohm.cm. Therefore, the photoelectric sensor of the present invention cannot attain the object of the present invention in electrophotography, whereas photoelectric sensors having a photoconductive layer with a relatively high dark resistivity for use in general electrophotography cannot be used for the purpose of the present invention.

The following relation holds between the resistivity ρ (ohm.cm) and current density J (A/cm$^2$) of the photoelectric sensor:

$$\rho=(E.d/J.S)\times(S/d)=E/J$$

where d is the layer thickness of the photoelectric sensor,
S is the electrode area, and
E is the applied field intensity (V/cm)

Therefore, the resistivity can be obtained from the applied field intensity and the current density. In Examples of the present invention, it is expressed by the current density.

When the information recording layer of the information recording medium is a polymer dispersed liquid crystal in particular, the sensitivity of the photoelectric sensor must be set in the operating voltage region of the liquid crystal. That is, the contrast voltage, which is a difference between the potential (light potential) applied to the information recording medium at the exposed region and the potential (dark potential) applied to the information recording medium at the unexposed region, must be set at a predetermined level in the operating voltage region of the liquid crystal in the information recording medium.

Therefore, the dark potential that is applied to the liquid crystal layer at the unexposed region of the photoelectric sensor, for example, must be set at a level approximately equal to the operation initiating potential of the liquid crystal. Accordingly, the photoelectric sensor is required to have a conductivity at which a base current in the range of $10^{-4}$ A/cm$^2$ to $10^{-7}$ A/cm$^2$, preferably in the range of $10^{-5}$ A/cm$^2$ to $10^{-6}$ A/cm$^2$ is generated under the condition where the resistivity of the information recording medium is in the range of $10^{10}$ ohm.cm to $10^{15}$ ohm.cm and an electric field of $10^5$ V/cm to $10^6$ V/cm is given to the photoelectric sensor. With a photoelectric sensor in which the base current is less than $10^{-7}$ A/cm$^2$, the molecules in the liquid crystal phase are not aligned even if exposure light is applied. With a photoelectric sensor in which the base current exceeds $10^{-4}$ A/cm$^2$, a large current flows at the same time as the voltage application is initiated even if no exposure light is applied, causing the molecules of the liquid crystal to be aligned. Therefore, even if exposure is carried out, no transmittance difference can be obtained between he exposed and unexposed regions. In addition, sincere the operating voltage and its range differ among liquid crystals, when the level of applied voltage and voltage application time are to be set, it is preferable to properly set the voltage distribution in the information recording medium.

The following is a description of a single-layer photoelectric sensor of the present invention in which the photoconductive layer of the photoelectric sensor comprises a single layer.

Figure 1:
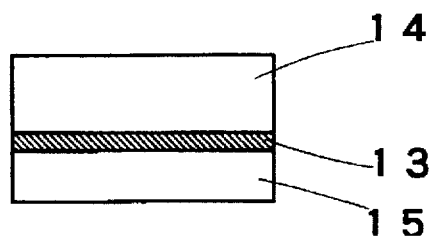
FIG. 1 is a sectional schematic that illustrates a single-layer type of photoelectric sensor.

FIG. 1 is a sectional view for explanation of the single-layer photoelectric sensor, in which reference numeral 1 denotes an electrode, 14 a photoconductive layer, and 15 a substrate. The photoconductive layer 14 is formed of an inorganic or organic photoconductive substance, binder and fluorescent substance.

Examples of inorganic photoconductive substances include Se, Se—Te, ZnO, TiO$_2$, Si, CdS, etc. These substances may be used alone or in the form of a combination of two or more of them. Such an inorganic photoconductive material is stacked on the electrode to a layer finely divided particles dispersed in a binder. Examples of binders usable in the present invention include a silicone resin, a polycarbonate resin, a polyvinyl formal resin, a polyvinyl acetal resin, a polyvinyl butyral resin, a styrene resin, a styrene-butadiene copolymer resin an epoxy resin, and acrylic resin, a saturated or unsaturated polyester resin, a methacrylic resin, a vinyl chloride resin, a vinyl acetate resin, a vinyl chloride-vinyl acetate copolymer resin, etc. These binder resins may be used alone or in the form of a combination of two ore more of them. It is preferable to disperse 0.1 to 10 parts by weight, preferably 1 to 5 parts by weight, of finely divided photoconductive particles in 1 part by weight of a binder resin material.

Organic photoconductive substances include dispersions of high- and low-molecular photoconductive substances in an insulating binder. Examples of high-molecular photoconductive substances are polyvinyl carbazole (PVK), and poly-N-ethylenic unsaturated group-substituted carbazoles in which an ethylenic unsaturated group, e.g., allyl group or acryloxyalkyl group, is contained in place of the vinyl group in PVK. Examples of high-molecular photoconductive substances further include poly-N-ethylemic unsaturated group-substituted phenothiazines, e.g., poly-N-acrylphenothiazine, poly-N-(β-acryloxy)phenothiazine, etc., and polyvinyl pyrene. Among these substances, poly-N-ethylenic unsaturated group-substituted carbazoles, particularly polyvinyl carbazole may preferably be employed.

Examples of low-molecular photoconductive substances are oxadiazoles substituted by alkylaminophenyl group or the like, a triphenylmethane derivative, a hydrazone derivative, a butadiene derivative, a stilbene derivative, etc. It is also possible to form the photoconductive layer by using a charge generating substance and a charge transport substance, which are employed in a double-layered photoelectric sensor. In such a case, the charge generating and transport substances may be mixed in the ratio of from 1:1 to 1:10, preferably from 1:2 to 1:5.

An organic photoconductive layer having film-forming properties may be formed by dispersing 0.1 to 10 parts by weight, preferably 0.1 to 1 part by weight, of an electrically insulating resin material in 1 part by weight of one selected from among the above organic photoconductive substances.

An organic photoconductive layer produced by any of the above-described methods is formed on the electrode so that the dry film thickness is in the range of 1 μm to 50 μm, preferably in the range of 3 μm to 20 μm. Within the film thickness range, the photoelectric sensor exhibits excellent sensitivity and image quality.

Figure 2:
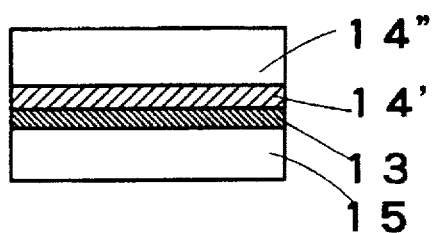
FIG. 2 is a sectional schematic that illustrates a stacked type of photoelectric sensor including a photoconductive layer comprising a charge generation layer and a charge transport layer.

Next, a double-layered photoelectric sensor will be explained. FIG. 2 is a sectional view for explanation of the double-layered photoelectric sensor, in which reference numeral 13 denotes an electrode, 14' a charge generation layer, 14" a charge transport layer, and 15 a substrate.

As illustrated in the figure, the double-layered photoelectric sensor has a photo-induced current amplifying layer, a charge generation layer and a charge transport layer, which are successively formed on the electrode. This type of photoelectric sensor includes an inorganic material photoelectric sensor and an organic material photoelectric sensor. The charge generation layer 14' in the inorganic material photoelectric sensor is formed on the electrode to a thickness of 0.05 μm to 1 μm by vapor deposition, sputtering, CVD, etc. using a material such as Se—Te or Si doped with sulfur or oxygen, for example.

The charge generation layer 14' in the organic material photoelectric sensor is composed of a charge generating substance and a binder. Examples of charge generating substances usable in the present invention are cationic dyes e.g., pyrylium dyes, thiapyrylium dyes, azulenium dyes, cyanine dyes, azulenium salt dye, etc., squalium salt dyes, phthalocyanine pigments, perylene pigments, polycyclic quinone pigments, e.g., pyranthrone pigments, etc., indigo pigments, quinacridone pigments, pyrrole pigments, and azo pigments, which are shown below. The dyes and pigments may be used alone or in the form of a combination of two or more of them.

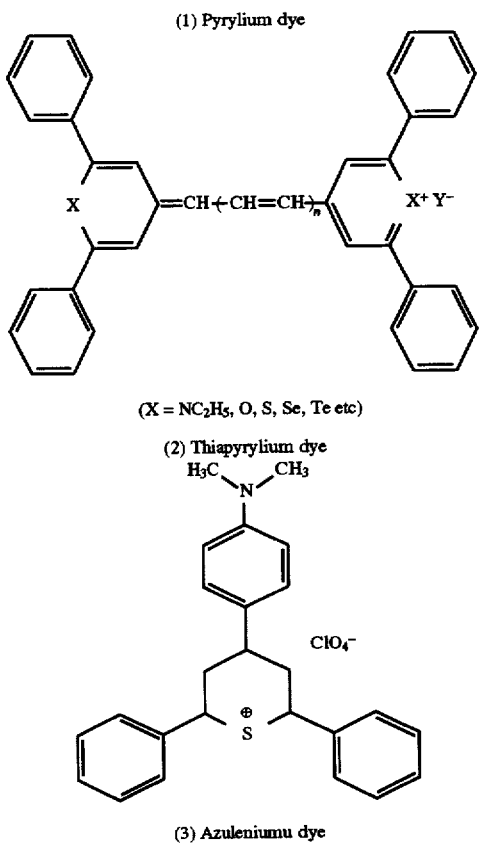

(1) Pyrylium dye (X = NC$_2$H$_5$, O, S, Se, Te etc)

(2) Thiapyrylium dye (3) Azuleniumu dye

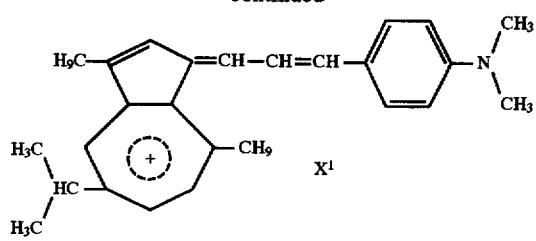

(4) Cyanine dye

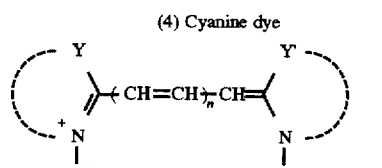

Y, Y' = O, S, Se, NH, CH=CH, C (CH$_3$)$_2$
R$^1$, R$^2$ = CH$_3$, C$_2$H$_5$, CH$_2$CH$_2$SO$_3^-$

X = Cl, Br, I, ClO$_4$, CH$_3$—⌬—SO$_3^-$ n = 0,1,2,3

(5) Azulenium salt

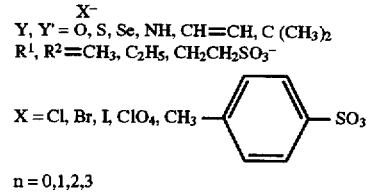

(6) Squalium salt

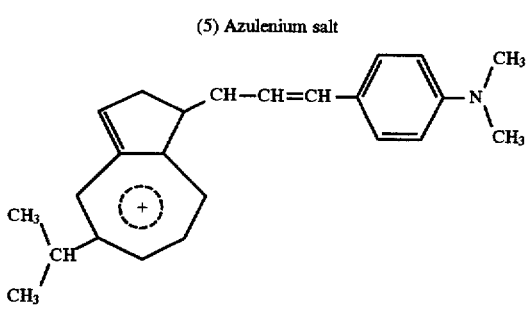

Y = H, OH, CH$_9$ (7) Phthalcyanine pigment

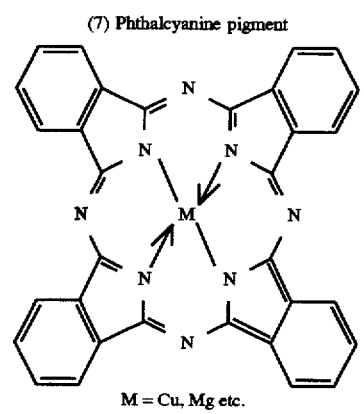

M = Cu, Mg etc.

(8) Perylene pigment

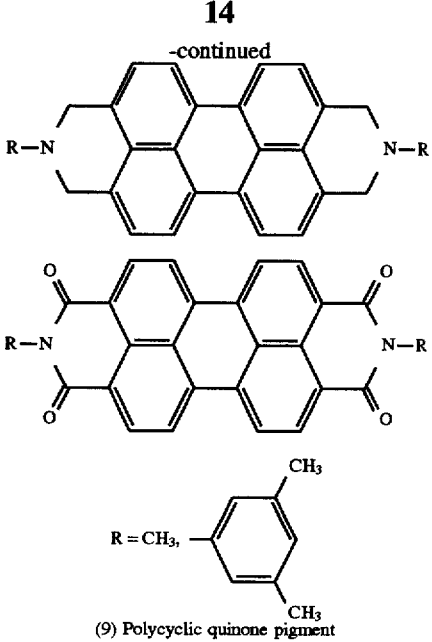

R = CH$_3$, —⌬(CH$_3$)$_2$ (9) Polycyclic quinone pigment

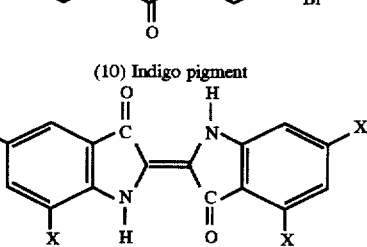

(10) Indigo pigment

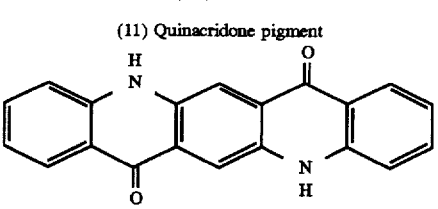

X = H, Cl, Br

(11) Quinacridone pigment

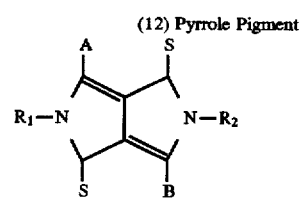

(12) Pyrrole Pigment

A, B = alkyl group, aralkyl group, cycloalkyl group or heterocyclic aromatic ring
R$_1$, R$_2$ = hydrogen atom, or substituent ring not imparting water solubility In addition, many azo pigments are usable. The chemical structure of particularly preferable azo pigments may be expressed by the central skeleton A and the coupler portion Cp as follows:

A—(N=N—Cp)$_n$

Specific examples of A are as follows:
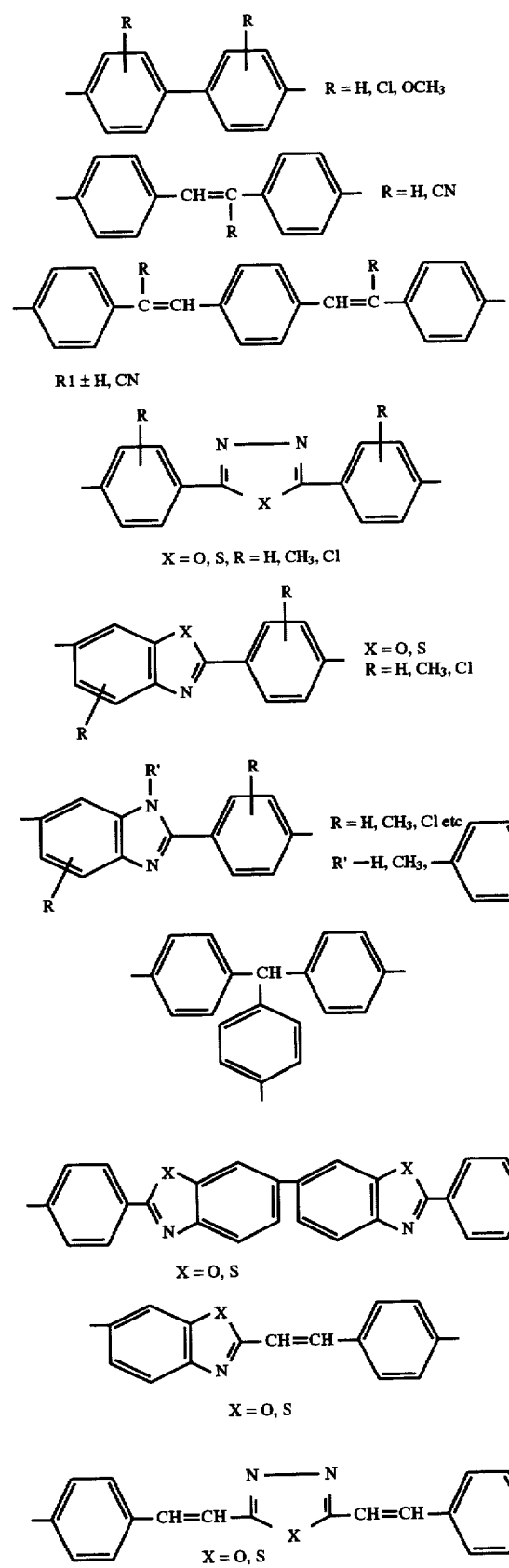
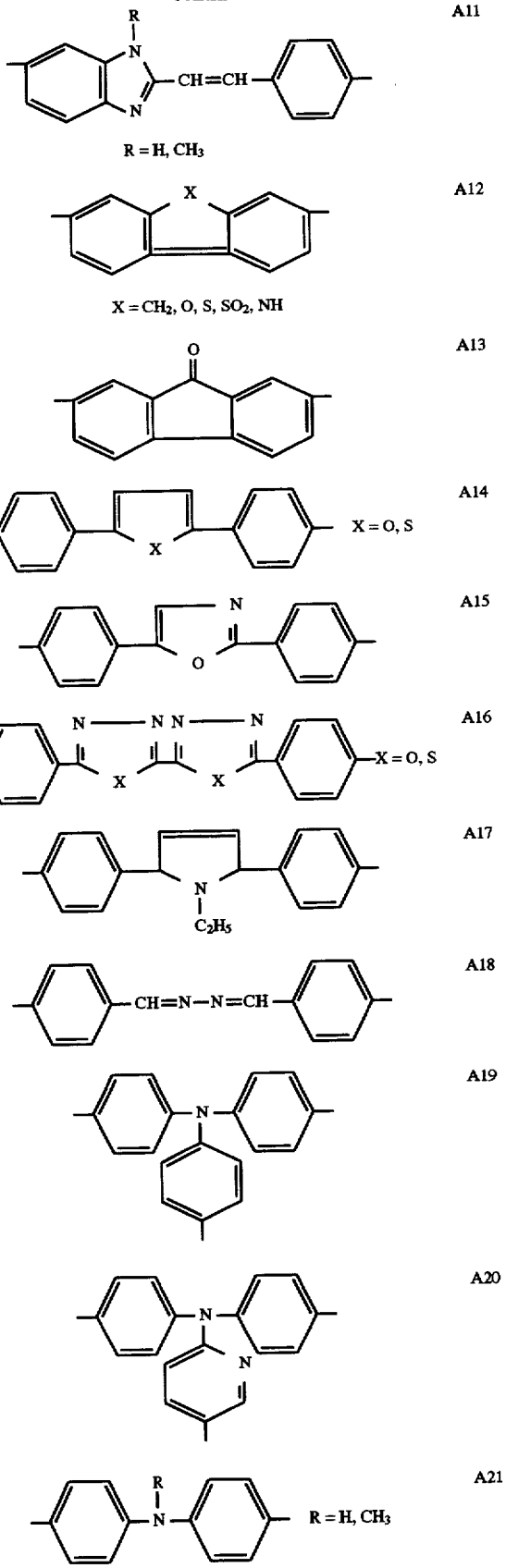

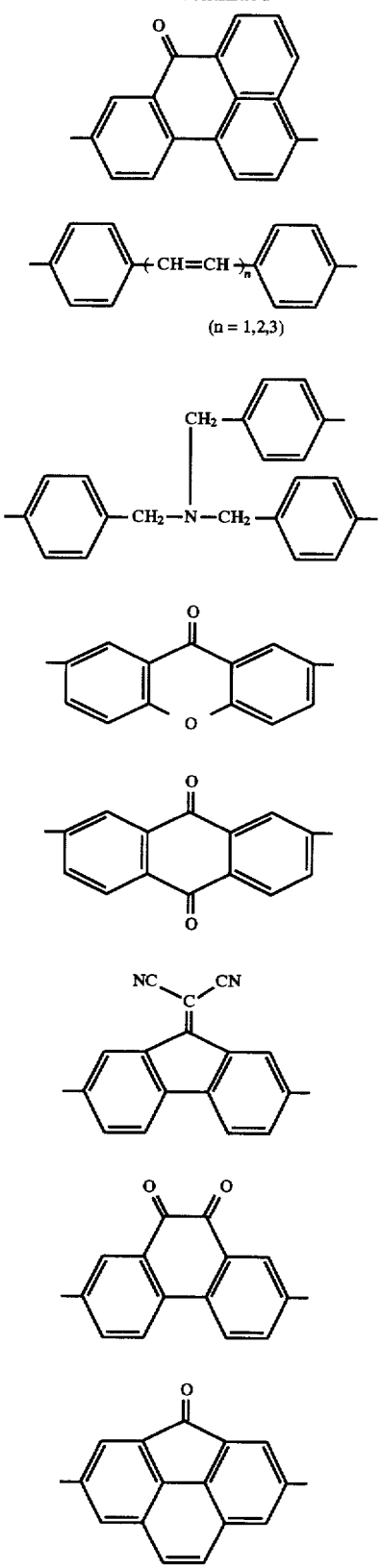
Specific examples of Cp are as follows:
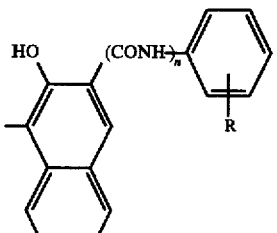
Cp-1
R = H, halogen atom, alkoxy group, alkyl group, nitro group, etc.
n = 1 or 2
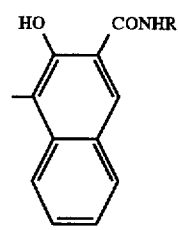
Cp-2
R = CH$_3$, C$_2$H$_5$, C$_9$H$_7$
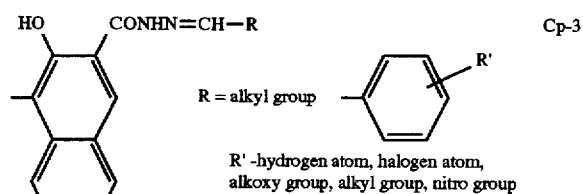
Cp-3
R = alkyl group
R' -hydrogen atom, halogen atom, alkoxy group, alkyl group, nitro group
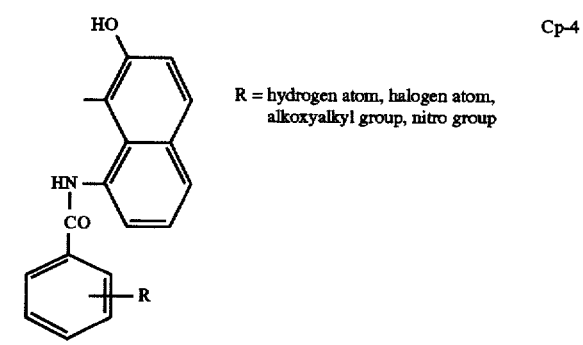
Cp-4
R = hydrogen atom, halogen atom, alkoxyalkyl group, nitro group
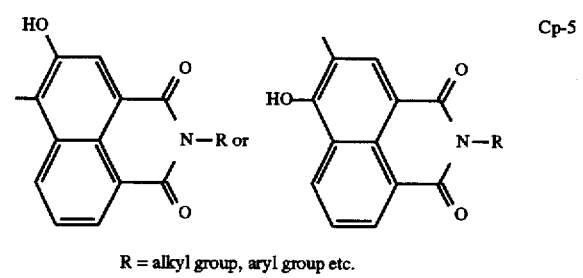
Cp-5
R = alkyl group, aryl group etc.
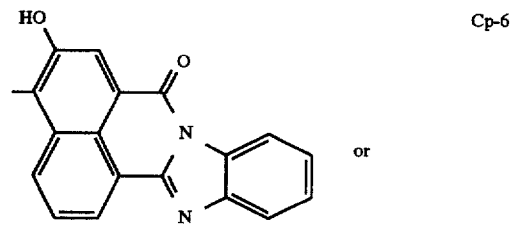
Cp-6
or

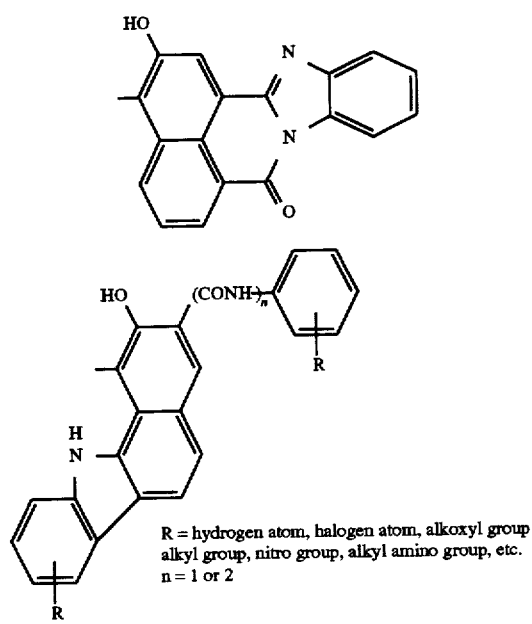

Cp-7

R = hydrogen atom, halogen atom, alkoxyl group alkyl group, nitro group, alkyl amino group, etc.
n = 1 or 2

By properly combining the above central skeleton A and coupler Cp, an azo dye suitable for use as a charge generating substance can be obtained.

Examples of binders usable in the present invention are a silicone resin, a polycarbonate resin, a polyvinyl formal resin, a polyvinyl acetal resin a polyvinyl butyral resin, a styrene resin, a styrene-butadiene copolymer resin, an epoxy resin, an acrylic resin, a saturated or unsaturated polyester resin, a methacrylic resin, a vinyl chloride resin, a vinyl acetate resin, a vinyl chloride-vinyl acetate copolymer resin, etc. These binder resins may be used alone or in the form of a combination of two or more of them.

It is preferable to mix 0.1 to 10 parts by weight preferably 0.2 to 1 part by weight, of a binder with 1 part of a charge generating substance. The dry film thickness of the charge generation layer is in the range of 0.01 μm to 2 μm, preferably in the range of 0.1 μm to 0.5 μm. Within this thickness range, the photoelectric sensor exhibits excellent sensitivity and image quality.

Among the above-mentioned charge generating substances, those which enable film formation by vapor deposition can be used alone within a binder.

The charge transport layer 14' is composed of a charge transport substance and a binder. The charge transport substance is a substance having excellent properties to transport electric charge generated in the charge generation layer. Examples of charge transport substances usable in the present invention are oxadiazole, oxazole, triazole, thiazole, triphenylmethane, styryl, pyrazoline, hydrazone, aromatic amine, carbazole, polyvinyl carbazole, stilbene, enamine, azine, triphenylamine and butadiene compounds, polycyclic aromatic compounds, and stilbene dimers. The charge transport substance must have excellent hole transport properties.

As for the binder, it is possible to use the same binders as those mentioned for the charge generation layer, and in addition, a polyarylate resin and a phenoxy resin can be used for the binder. Preferable examples of binders are a styrene resin, a styrene-butadiene copolymer resin, and a polycarbonate resin. It is preferable to use 0.1 to 10 parts by weight, preferably 0.1 to 1 part by weight, of a binder per part by weight of a charge transport substance. The dry film thickness of the charge transport layer is in the range of 1 μm to 50 μm, preferably in the range of 3 μm to 20 μm. With such a film thickness, excellent sensitivity and image quality can be obtained.

It is possible to form the charge transport layer and the charge generation layer, which are successively formed on the electrode adverse order shown in FIG. 2.

Among the above-mentioned charge transport substances, those which enable film formation by vapor deposition can be used alone without a binder.

Then, the fluorescent substance that characterizes the present invention will be explained. The fluorescent substance according to the present invention may be either used as a charge transport substance for the charge transport layer or added to the charge generation layer as an additive.

The fluorescent substance used herein absorbs mainly light lying in the wavelength range of 300 nm to 500 nm, and emits mainly fluorescence lying in the range of 450 nm to 600 nm. The fluorescent substance may have any desired structure if it may be added to the photoconductive layer by dispersion, mixing, dissolution or the like, or it may alternatively have the capability of transporting charges and so used as a charge transport layer.

The fluorescent substance having the capability of transporting charges, for instance, includes compounds having the following structure.

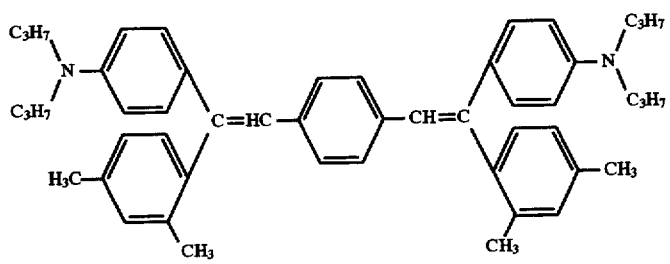

-continued

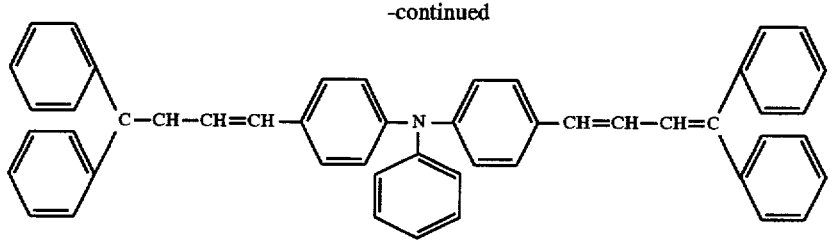

The electrode 13 needs to be transparent if the information recording medium (described later) is opaque. However, if the information recording medium is transparent, the electrode 13 may be either transparent or opaque. Any material which stably gives a resistivity of not higher than $10^6$ ohm.cm can be used for the electrode 13. Examples of such material are a thin metallic conductive film, e.g., gold, platinum, zinc, titanium, copper, iron, tin, etc., a metallic oxide conductive film, e.g., tin oxide, indium oxide, zinc oxide, titanium oxide, tungsten oxide, vanadium oxide, etc., and an organic conductive film, e.g., quaternary ammonium salt, and so forth. These materials may be used alone or in the form of a composite material comprising two or more of them. Among these materials, oxide conductors are preferable; indium-tin oxide compound (ITO) is particularly preferable.

The electrode 13 is formed by vapor deposition, sputtering, CVD, coating Plating dipping, electrolytic polymerization, etc. The film thickness of the electrode needs to be changed depending upon the electric characteristics of the material thereof and the level of voltage applied during information recording. For example, the thickness is about from 10 nm to 300 nm in the case of an ITO film. The electrode 13 may be formed either on the whole area between the substrate and the information recording layer or in conformity with a desired pattern. The electrode 13 may also be formed by stacking two or more different kinds of material.

The substrate 15 needs to be transparent if the information recording medium (described later) is opaque. However, if the information recording medium is transparent, the substrate 15 may be either transparent or opaque. The substrate 15 has the shape of card, film, tape, disk or the like and supports the photoelectric sensor so as to provide the required strength. Accordingly, the substrate 15 need not be provided if the photoelectric sensor itself has supporting properties, and various materials are usable, provided that they are sufficiently strong to support the photoelectric sensor. Examples of usable materials are a flexible plastic film, or a rigid material such as glass, plastic sheet, card, etc., made of polyethylene, polyproxylene, polyethylene terephthalate, polymethyl methacrylate, polymethyl acrylate, polyester, polycarbonate, etc.

It should be noted that if the electrode 13 is transparent, anti-reflection properties are preferably imparted to the substrate by stacking a layer having anti-reflection effect on the surface of the substrate 15 which is remote from the electrode 13, or by adjusting the film thickness of the transparent substrate to a level at which anti-reflection effect is obtainable, or by combining together these two measures, according to need.

The photo-induced current amplifying layer may be provided between the electrode 13 and the photoconductive layer 14 or the charge generation layer 14'. Although the reason is not clear, the photo-induced current amplifying layer 16 has the action of amplifying the photo-induced current in the photoelectric sensor, the action of controlling the injection of charge carriers from the electrode 13 into the photoconductive layer 14 or the charge generation layer 14' to thereby control the voltage actually applied to the information recording medium, and the action of uniforming the injection of charge carriers from the electrode 13 into the photoconductive layer 14 or the charge generation layer 14' to thereby reduce the noise, unevenness and so forth of information recorded on the information recording medium. The first action is effective in improving the recording sensitivity of the photoelectric sensor. The second action is effective in controlling the image density of the recorded image. Further, the third action is effective in improving the image quality of the recorded image.

For the photo-induced current amplifying layer in the present invention, the same binder as that used in the above-described charge generation layer may be used. Examples of binders usable in the present invention include a silicone resin, a polycarbonate resin a polyvinyl formal resin, a polyvinyl acetal resin, a polyvinyl butyral resin, a styrene resin, a styrene-butadiene copolymer resin, an epoxy resin, an acrylic resin, a saturated or unsaturated polyester resin, a methacrylic resin, a vinyl chloride resin, a vinyl acetate resin, a vinyl chloride-vinyl acetate copolymer resin, etc. these binder resins may be used alone or in the form of a combination of two or more of them. It is also possible to use a soluble polyamide, a phenolic resin, a polyurethane, a polyurea, a casein, a polypeptide, a polyvinyl alcohol, polyvinyl pyrrolidone, a maleic anhydride ester polymer, a quaternary ammonium salt-containing polymer, a cellulose compound, etc. These binder resins may be used alone or in the form of a combination of two or more of them. Particularly preferable examples are a polyvinyl formal resin, a polyvinyl acetal resin, and a polyvinyl butyral resin.

The thickness of the photo-induced current amplifying layer is set in the range of 0.005 µm to 5 µm, preferably in the range of 0.05 µm to 5 µm. The photo-induced current amplifying layer may be provided by a coating method e.g., dip coating, roll coating, spin coating, etc. If the thickness is less than 0.005 µm, no image noise reducing action is available. If the thickness is greater than 5 µm, the resulting layer will hinder the injection of charge carriers from the electrode into the charge generation layer.

Further, various kinds of electron accepting substance, electron donating substance, photoconductive substance, inorganic salt and organic salt may be added to the photo-induced current amplifying layer according to need. These additives may be used alone or in the form of a combination of two or more of them.

Examples of electron accepting substances include substituted benzenes, substituted naphthalenes, substituted or non-substituted benzoquinones represented, substituted and non-substituted naphthoquinones, substituted and non-substituted anthraquinones, substituted fluorenones, chloranil, and substituted quinodimethans.

Examples of usable photoconductive substances include inorganic and organic photoconductive substances mentioned above for the single-layer photoelectric sensor and charge generating substances mentioned above for the double-layered photoelectric sensor. Examples of inorganic photoconductive substances are Se, Se—Te, ZnO, $TiO_2$, Si, Si doped with sulfur, oxygen or the like, CdS, etc. These inorganic photoconductive substances may be used in the form of finely divided particles alone or in a combination of two or more of them. Organic photoconductive substances include high- and low-molecular photoconductive substances. Examples of high-molecular photoconductive substances are polyvinyl carbazole (PVK), and poly-N-ethylenic unsaturated group-substituted carbazoles in which an ethylenic unsaturated group, e.g., allyl group or acryloxyalkyl group, is contained in place of the vinyl group in PVK. Examples of high-molecular photoconductive substances further include poly-N-ethylenic unsaturated group-substituted phenothiazines, e.g., poly-N-acrylphenothiazine, poly-N-($\beta$-acryloxy)phenothiazine etc., and polyvinyl pyrene.

Examples of low-molecular photoconductive substances are oxadiazoles substituted by alkylaminophenyl group or the like, a triphenylmethane derivative, a hydrazone derivative, a butadiene derivative, a stilbene derivative, etc.

Examples of charge generating substances usable in the present invention are cationic dyes, e.g., pyrylium dyes, thiapyrylium dyes, azulenium dyes, cyanine dyes, azulenium salt dye, etc., squalium salt dyes, phthalocyanine pigments, perylene pigments, polycyclic quinone pigments, e.g., pyranthrone pigments, etc., indigo pigments, quinacridone pigments, pyrrole pigments, and azo pigments. The dyes and pigments may be used alone or in the form of a combination of two or more of them.

These additives are added in the ratio of 0.001 to 10 parts by weight, preferably 0.05 to 5 parts by weight, to 1 part by weight of a binder resin. The additives may be used alone or in the form of a combination of two or more of them. It is particularly preferable to use a combination of an electron accepting compound and an organic photoconductive pigment, e.g., a substituted benzoquinone and an azo pigment. With such a combination, particularly great amplifying action is obtained.

Next, the information recording medium 2 will be explained. There is a case where the information recording medium used in the present invention has an information recording layer formed of a polymer-liquid crystal complex (LCPC).

The polymer-liquid crystal complex (LCPC) has a structure in which resin particles are dispersed in a liquid crystal phase. Examples of usable liquid crystal materials are a smectic liquid crystal, nematic liquid crystal, cholesteric liquid crystal and a mixture of these liquid crystals. However, it is preferable to use a smectic liquid crystal from the point of view of retaining the liquid crystal alignment and holding the recorded information permanently that is, from the viewpoint of memory effect.

Examples of smectic liquid crystals usable in the present invention are as follows: cyanobiphenyl, cyanoterphenyl and phenylester liquid crystals, in which the end group of a liquid crystalline substance has a long carbon chain, liquid crystal substances that present smectic A phase, e.g., fluorine liquid crystal; liquid crystal substances presenting smectic C phase, which are used as ferroelectric liquid crystals; and liquid crystal substances that present smectic H, G, E or F phase.

Examples of material which are preferable to use for forming the resin phase are ultraviolet curing resin materials which are compatible with a liquid crystal material or a common solvent therewith in the form of a monomer or an oligomer. Examples of such ultraviolet curing resin materials are acrylic and methacrylic esters. It is also possible to use thermosetting resin materials which are compatible with a solvent common to the liquid crystal material, for example, an acrylic resin, methacrylic resin, polyester resin, polystyrene resin, copolymers composed mainly of these resin materials, epoxy resin, silicone resin, etc.

It is preferable to use a liquid crystal and a resin material in such a ratio that the liquid crystal content in the information recording layer is 10% to 90% by weight, more preferably 40% to 80% by weight. If the liquid crystal content is less than 10% by weight, light transmittance is low even when the molecules in the liquid crystal phase are aligned by recording of information, whereas, if the liquid crystal content exceeds 90% by weight, the liquid crystal oozes out, causing unevenness of the recorded information.

Since the thickness of the information recording layer influences the definition of recorded information, it is preferable to set the thickness of the layer after it has been dried in the range of 0.1 μm to 10 μm, more preferably 3 μm to 8 μm. By doing so, the operating voltage can be lowered with the definition maintained at high level. If the information recording layer is excessively thin, the contrast of the information recording part becomes low, whereas, if the layer is excessively thick the operating voltage becomes high.

Figure 7:
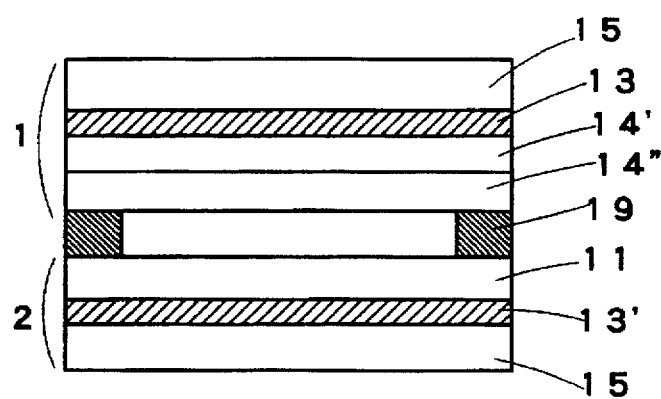
FIG. 7 is a sectional schematic that illustrates one embodiment of the information recording system.

The information recording medium is disposed to face the photoelectric sensor across a spacer 19 made of an insulating resin film such as polyimide, as shown in FIG. 7, and the electrodes 13 and 13' are connected to each other through a voltage source V, thereby forming a first information recording system of the present invention. At least one of the electrodes 13 and 13' in this system must be transparent.

Figure 8:
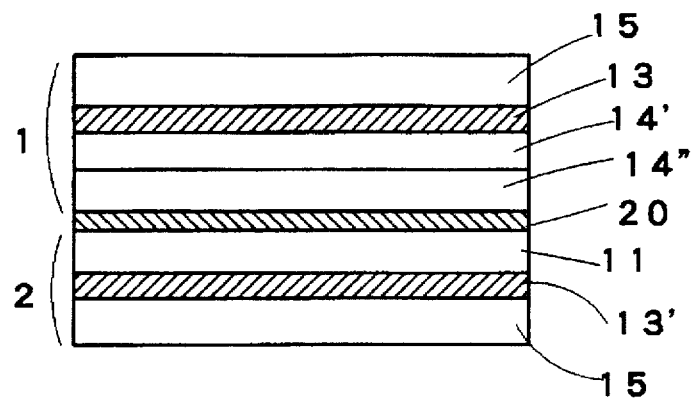
FIG. 8 is a sectional schematic that illustrates another embodiment of the information recording system.

Next, the second information recording system will be explained. FIG. 8 is a sectional view of the second information recording system according to the present invention, in which reference numeral 20 denotes a dielectric layer, and the same reference numerals as those in FIG. 2 denote the same contents.

The second information recording system is arranged such that the photoelectric sensor and the information recording medium in the first information recording system are disposed to face each other across a dielectric layer 20 without an air gap. The second information recording system is particularly suitable for an arrangement in which the photoconductive layer of the photoelectric sensor is formed by coating using a solvent. The arrangement of the second information recording system makes it possible to prevent unevenness of the recorded image which might otherwise be caused by elution of the liquid crystal from the information recording layer by the interaction between the photoconductive layer and the information recording layer if the latter is coated directly on the former, or elution of the photoconductive material by a solvent used for forming the information recording layer. It is also possible to integrate the photoelectric sensor and the information recording medium into one unit.

The material for forming the dielectric layer 20 needs to be incompatible with either of the materials for forming the photoconductive layer and the information recording layer and must not have electrical conductivity. If the material is electrically conductive, the space charge is diffused, causing deterioration of the resolution. Therefore, insulating properties are required. However, since the dielectric layer lowers the distributed voltage that is applied to the liquid crystal layer or degrades the definition, it is preferable for the layer thickness to be as small as possible, preferably 2 μm or less. On the other hand, reduction in the layer thickness gives rise to not only generation of image noise due to the interaction that progresses with the passage of time but also the problem of permeation due to defects such as pinholes at the time of coating the material for stacking the layer. Since the permeability depends on the proportion of the solid content of the material to be coated for stacking, the kind of solvent used and the viscosity, the layer thickness is properly set in accordance with the material which is to be coated. The layer thickness is preferably 10 μm or less, more preferably in the range of 0.1 μm to 3 μm. When the voltage distribution to each layer is taken into consideration, it is preferable to use a material having a high dielectric constant as well as to minimize the layer thickness.

For example, the dielectric layer is preferably formed by depositing an inorganic material, e.g., $SiO_2$, $TiO_2$, $CeO_2$, $Al_2O_3$, $GeO_2$, $Si_3N_4$, AlN, TiN, $MgF_2$, ZnS, a mixture of silicon dioxide and titanium dioxide, a mixture of zinc sulfide and magnesium fluoride, a mixture of aluminum oxide and germanium, etc., by vapor deposition, sputtering, chemical vapor deposition (CVD), etc. It is also possible to use an aqueous solution of polyvinyl alcohol, water-system polyurethane, water glass, etc. as a water-soluble resin material which is less compatible with an organic solvent and to coat such an aqueous solution by spin coating, blade coating, roll coating and so forth. Further, a coatable fluorocarbon resin may also be used. In such a case, it may be dissolved in a fluorine-containing solvent and coated by spin coating or stacked by blade coating, roll coating, etc.

Coatable fluorocarbon resins which are preferable to use include fluorocarbon resins disclosed, for example, in Japanese Patent Application Laid-Open (KOKAI) JP06130347 (A), and organic materials, e.g., poly-para-xylylene, etc., which are subjected to film formation in a vacuum system.

Figure 9:
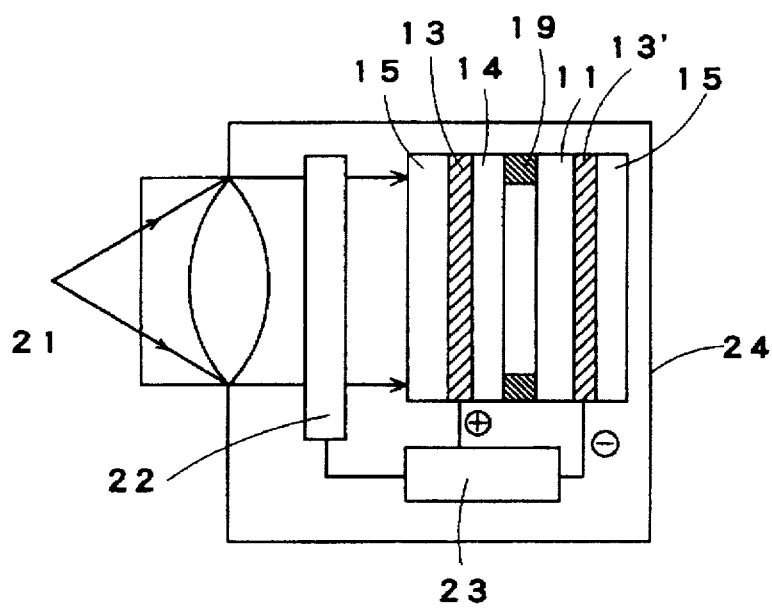
FIG. 9 is a schematic that illustrates an information recording method using the information recording system according to the present invention.

The following is a description of an information recording method for the first and second information recording systems of the present invention. FIG. 9 is a sectional view for explanation of the information recording method for the first information recording system of the present invention. For the second information recording system also, the information recording method is carried out in the same way. In the figure, reference numeral 11 denotes an information recording layer, 13 an electrode of a photoelectric sensor, 13' an electrode of an information recording medium, 14 a photoconductive layer, 21 a light source, 22 a shutter having a driving mechanism, 23 a pulse generator serving as a power source, and 24 a camera obscura.

When information light is incident on the information recording system with an appropriate voltage applied between the electrodes 13 and 13' from the pulse generator 23, photocarriers are generated in the photoconductive layer 14 at the region where the light is incident, and the photocarriers move as far as the interface of the photoconductive layer 14 on the side thereof which is closer to the information recording layer 11 by the electric field formed by the two electrodes 13 and 13', causing redistribution of the voltage. As a result, the molecules in the liquid crystal phase in the information recording layer 11 are aligned in the pattern of information light, thereby recording the desired information.

The information recording method of the present invention enables planar analog recording and makes it possible to obtain recording at the liquid crystal particle level and hence high resolution, and it also permits the exposure light pattern to be retained in the form of a visible image by the molecular alignment in the liquid crystal phase.

To record information with the information recording system, a method that uses a camera or a recording method that uses laser may be employed. The recording method by a camera uses an information recording medium in place of a photographic film used in an ordinary camera. Either an optical or electric shutter can be used for this camera. It is also possible to conduct color photography by using a prism and a color filter by which light information is separated into R, G and B light components as shown in FIG. 23 and taken out in the form of parallel rays, and forming one frame from three information recording mediums for R, G and B light components or from one set of R, G and B images recorded on different portions of one information recording medium. When information is recorded on the information recording medium while it is separated into such RGB wavelength regions (the blue, green and red regions of 400 to 510 nm, 470 to 600 nm and 560 to 700 nm, respectively) as shown in FIG. 23, separately distinctive effects are expected for those regions and the blue region alone is subjected to the amplifying action, so that the color balance can be much more improved.

Figure 10:
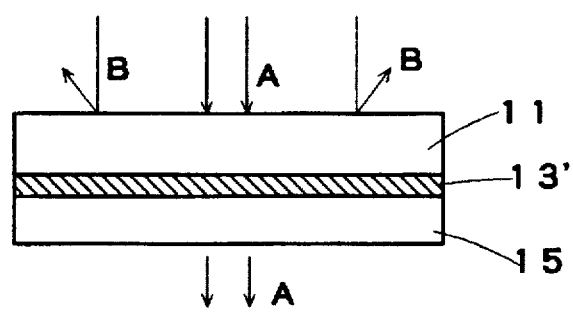
FIG. 10 is a schematic that illustrates a method for reproducing the recorded information.

The exposure light information recorded on the information recording medium is reproduced by transmitted light, as shown in FIG. 10. In the case of the first information recording system, light is applied to the information recording medium separated from the system, whereas, in the case of the second information recording system, light is applied thereto in this state, without separating the information recording medium. Consequently, in the information recording region, light A is transmitted because the liquid crystal molecules are aligned in the direction of the electric field, whereas, in the region where no information has been recorded, light B is scattered, thus presenting a contrast with the information recording region. The recorded information may be read by reflected light by use of a light-reflecting layer.

For example, in the first information recording system having the stack structure incorporated therein, as shown in FIG. 9, the photoelectric sensor of the present invention and an information recording medium are loaded into an imaging camera (e.g., RB67, manufactured by Mamiya Camera Co., Ltd.) in place of an ordinary photographic film. Then, a DC voltage of 700 V is applied between the respective electrodes of the photoelectric sensor and the information recording medium for 0.04 sec., and at the same time, exposure is carried out by projecting a gray scale from the photoelectric sensor side for 1/30 sec. By doing so, record regions comprising light-transmitting portions corresponding to the gray scale are formed on the information recording layer. Thus, information recording can be effected.

Figure 11:
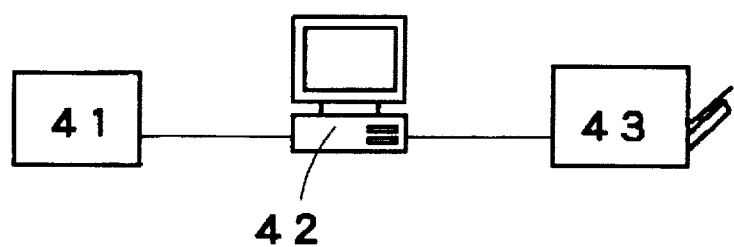
FIG. 11 is a schematic that illustrates an information output device.

Next, the information recorded on the information recording medium is read with an image scanner having a CCD line sensor in an information output system as shown in FIG. 11, and the read information is output by using a sublimation transfer printer (e.g., SP-5500, manufactured by Victor Company of Japan, Limited). As a result, a favorable print corresponding to the gray scale can be obtained.

Information that is recorded on the molecular alignment in the liquid crystal is visible information which can be read by visual observation, and it can also be read in the form of an enlarged image by using a projector. When laser scanning or CCD is used, the information can be read with high accuracy. It should be noted that occurrence of scattered light can be prevented by using a Schlieren optical system, if necessary.

In the above-described information recording medium, information recorded by exposure light is made visible by the molecular alignment in the liquid crystal, and the information once made visible can be kept from disappearing by properly selecting a combination of a liquid crystal and a resin material. Thus, memory properties can be imparted to the information recording medium. Since the recorded visible information can be erased by heating the information recording medium to a high temperature near the isotropic phase transition temperature, the information recording medium can be reused.

As the information recording medium in the information recording system, it is also possible to use an electrostatic information recording medium having an electric charge layer as an information recording layer, as described, for example, in Japanese Patent Application Laid-Open (KOKAI) Nos. JP037942(A), JP05107775(A), JP05107776 (A), JP 05107777(A), and JP 04780842(A). In this case, information is stored in the form of electrostatic charge in the information recording medium. Therefore, the electrostatic charge can be reproduced by toner development, or by an electric potential reading method as described, for example, in Japanese Patent Application Laid-Open (KOKAI) No. JP01290366(A). It is also possible to use an information recording medium having a thermoplastic resin layer as an information recording layer, as described, for example, in Japanese Patent Application Laid-Open (KOKAI) No. JP0446347(A). In this case, after information has been stored in the form of electrostatic charge on the surface of the information recording medium in the same way as the above, the thermoplastic resin layer is heated to thereby store the information as a frost image, which can be reproduced as visible information.

The photoelectric sensor used for recording light information on the information recording medium according to the present invention includes a photoconductive layer stacked on an electrode and is semiconductive. When the information recording medium is exposed to information light while voltage is applied across the electrode of the photoelectric sensor and an electrode of the information recording medium, or when voltage is applied across the two electrodes while the information recording medium is exposed to information light, the electric field or the quantity of charges imparted to the information recording medium is amplified. Even after termination of exposure to information light, conductivity is maintained by a continued application of voltage, so that the electric field or the quantity of charges can subsequently be applied to the information recording medium. In view of the color balance, it is preferable that the photoelectric sensor used for recording color image information on the information recording medium be of uniform sensitivity to wavelengths lying in the visible light region of 400 to 700 nm. However, the spectroscopic characteristics of the photoelectric sensor is governed by those of the charge generation substance contained in the charge generation layer, and so the photoelectric sensor is generally low in terms of the sensitivity to the blue wavelength region. It is thus difficult to obtain images well balanced among colors.

The substance that absorbs the light lying in the blue wavelength range and is less absorbed by the charge generation substance and emits the light lying in the green wavelength region in the form of fluorescence is used as a charge transport substance or added to the photoconductive layer as an additive, whereby the light lying in the blue wavelength region is absorbed in the charge generation substance in the form of fluorescence lying in the green wavelength region, so that the sensitivity to the blue wavelength region can be increased, resulting in the formation of images well balanced among colors.

The present invention will be described below more specifically by way of Examples.

EXAMPLE 1

(Preparation of the Stacked Type Photoelectric Sensor)

Using electron beam evaporation, an ITO film having surface resistance of 80 Ω/□ and a thickness of 100 nm was formed on a well-washed glass substrate of 1.1 mm in thickness to obtain an electrode. Using a scrubber washer (made by Enya System K.K., and available under the trade name of SSD-1), the electrode was flushed with pure water for 11 seconds and then scrubbed with a washing agent (made by Junsei Kagaku K.K., and available under the trade name of RBS-25) for 20 seconds, then rinsed with pure water for 20 seconds, and finally dried in a dryer of 120° C. for 1 hour.

Three (3) parts of bisazo dye having the following structure as a charge generation substance

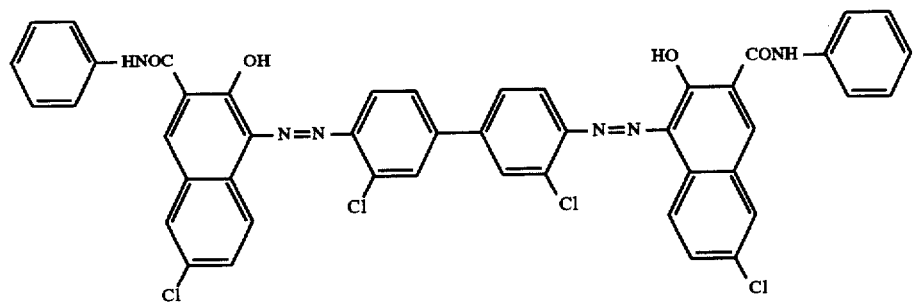

and 1 part by weight of polyvinyl formal resin were mixed with 98 parts by weight of 4-dioxane and 98 parts by weight of cyclohexanone, and the mixture was fully kneaded by means of a paint shaker to prepare a coating solution. Then, this solution was spin-coated on the above-mentioned electrode at 1,400 rpm for 0.4 seconds, and air-dried and then dried at 100° C. for 1 hour to stack a 0.3 μm thick charge generation layer on the electrode.

Then, 5 parts by weight of biphenylamine derivative having the following structure as a charge transport substance

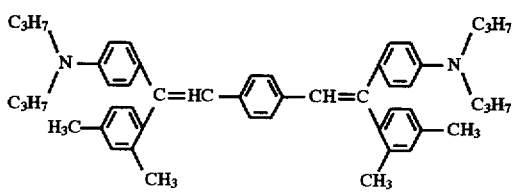

and 1 part by weight of polycarbonate resin (made by Mitsubishi engineering Plastics K.K., and available under the trade name of Yupiron Z-200) were uniformly dissolved in 18 parts by weight of dichloromethane and 27 parts by weight of 1,1,2-trichloroethane to prepare a coating solution. This coating solution was spin-coated on the above-mentioned charge generation layer at 550 rpm for 0.4 seconds, then subjected to leveling drying after allowed to stand in a windless state, and finally dried at 80° C. for 2 hours to stack a 10 μm thick charge transport layer thereon.

(Electrical characteristics of the photoelectric sensor)

Figure 12:
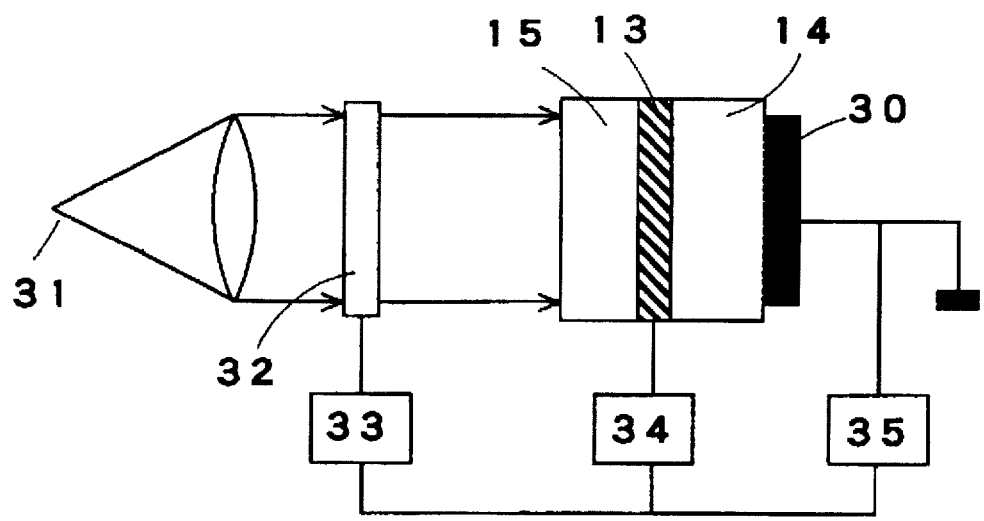
FIG. 12 is a schematic that illustrates a current measuring device.

To measure the electric characteristics of the photoelectric sensor thus obtained, a sample for measurement was prepared by depositing a gold electrode having a size of 0.16 $cm^2$ a thickness of 10 nm and surface resistivity of 1,000 ohm/□ on the charge transport layer of the photoelectric sensor, and a current measuring system as shown in FIG. 12 was constructed. In the figure, reference numeral 15 denotes a photoelectric sensor substrate, 13 a photoelectric sensor electrode, 14 a photoconductive layer including a charge generation layer and a charge transport layer, 30 a gold electrode, 31 a light source, 32 a shutter (No. O electromagnetic shutter, manufactured by Copal Co., Ltd.), 33 a shutter driving mechanism, 34 a pulse generator (manufactured by Japan Hewlett-Package Co.), and 35 an oscilloscope.

In the current measuring system, a DC voltage of 150 V was applied between the photoelectric sensor electrode 13 as a positive electrode and the gold electrode 30 as a negative electrode, and 0.5 sec. after the initiation of the voltage application, light was applied from the glass substrate side for 0.033 sec. In this state, the current flowing in the photoelectric sensor was measured with the light irradiation initiation time set at t=0. The light for irradiation was selected from light emitted from a xenon lamp (L2274, manufactured by Hamamatsu Photonics K.K.) as a light source by using a monochrometer (H20-VIS manufactured by JOBIN YVON Co.,) and applied to the photoelectric sensor. The intensity of irradiation light was measured with an illuminometer (TQ8210 manufactured by ADVAN TEST Co.,).

The voltage application was continued for 0.15 sec. from the light irradiation initiation time even after the termination of the light irradiation, and the change of current with time during the voltage application was measured with the oscilloscope. In another experiment, no exposure was carried out, but the voltage application alone was performed, and the change of current with time was measured in the same way as the above. The measurement was carried out at room temperature.

The results of the measurement are shown in FIG. 13. In the graph of the figure, the axis of abscissas represents the voltage application time (second) and the axis of ordinates represents the current density ($10^{-6}$ $A/cm^2$). In the figure, the time (A) shows the measured current value in the case where exposure was carried outf and the line, (B) shows the measured current value in the case where no exposure was carried out, but the voltage application alone was performed.

As shown by the line (A), two points (a) and (b) of inflections are observed on the curve representing the amount of current flowing in the photoelectric sensor of the present invention. It is considered from the comparison with a comparative sensor (described later) that the amount of current below the inflection point (a) is the amount of current flowing in proportion to the quantity of exposure energy (the current will be hereinafter referred to as "photo-induced current"). The inflection point (b) is a point of change in the amount of current due to the termination of the exposure. Thus, it will be understood that even after the termination of the exposure and even when no exposure is carried out, a current corresponding to the applied voltage continuously flows, and the current gradually decays.

Figure 14:
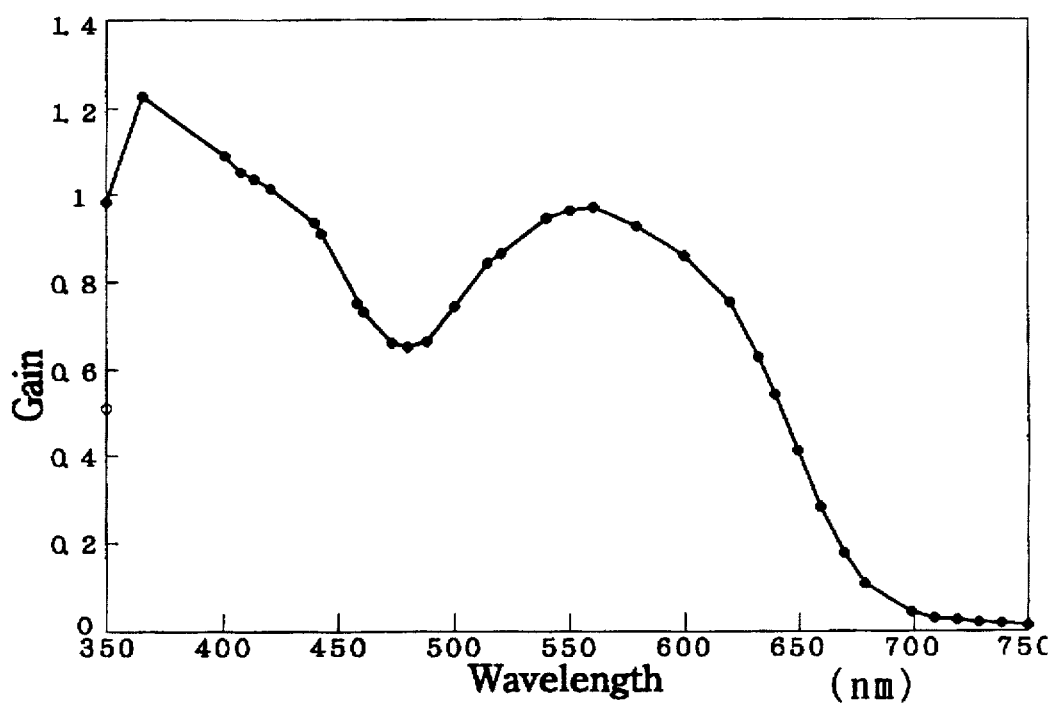
FIG. 14 is a view that illustrates gains at given wavelengths of the photoconductive layer of one embodiment of the photoelectric sensor according to the present invention.

Here assume a gain of 1 is obtained when irradiated with monochromatic light of 560 nm. Gains at given wavelengths are shown in FIG. 14. Absorption spectra of the charge generation layer are shown in FIG. 21. From this figure, it is found that, irrespective of the absorption of the charge generation layer, the sensitivity increases in the blue wavelength region in the vicinity of 400 nm.

(Measurement of Absorption Spectra)

Figure 15:
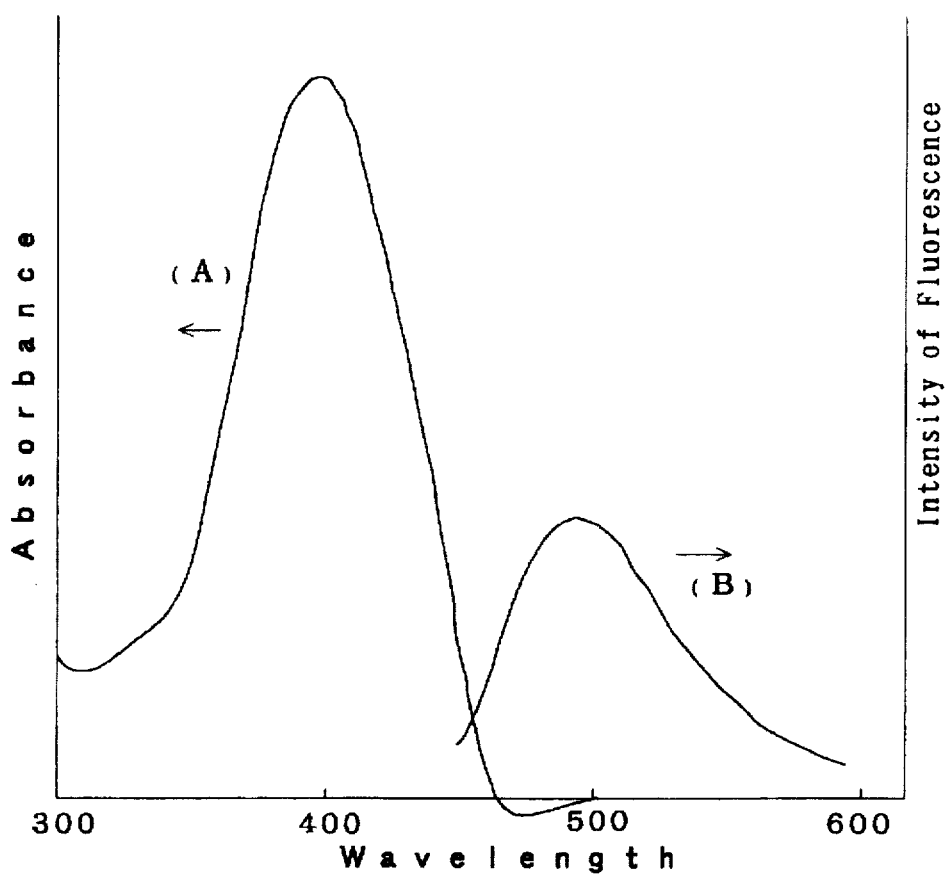
FIG. 15 is a view that illustrates absorption and fluorescence spectra at given wavelengths of the charge transport layer of one embodiment of the photoelectric sensor according to the present invention.

Absorption spectra of the charge transport layer were measured using a spectrophotometer (UV-240 made by Shimadsu Corporation). The results are given at (a) in FIG. 15. Absorption was observed in the vicinity of 400 nm.

(Measurement of Fluorescent Spectra)

Fluorescent spectra of the charge transport layer were measured using a spectrofluorometer (F4010 made by Shimadzu Corporation) and light of 400 to 450 nm as excitation light. The results are shown at (B) in FIG. 15. A strong fluorescent spectrum was found in the vicinity of 497 nm at which the charge generation substance shows absorption.

From the foregoing results, it appears that the charge transport substance in the charge transport layer absorbs light lying in the blue wavelength region in the vicinity of 400 nm and emits light lying in the green wavelength region in the vicinity of 497 nm, so that the charge generation substance of the charge generation layer can absorb the thus emitted light to generate carriers, resulting in an increase of the sensitivity to the blue wavelength region.

EXAMPLE 2

A photoelectric sensor was prepared as in Example 1 with the exception that the following compound was used instead of the charge transport substance of Example 1.

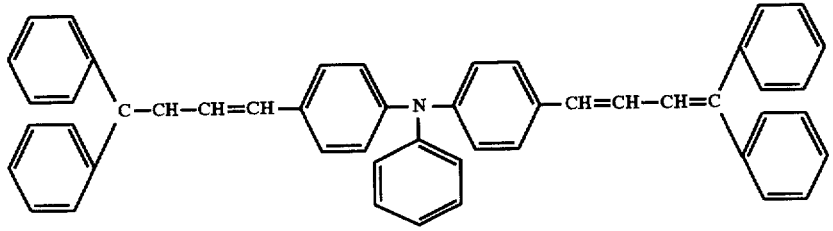

(Electrical Properties of the Photoelectric Sensor)

Figure 16:
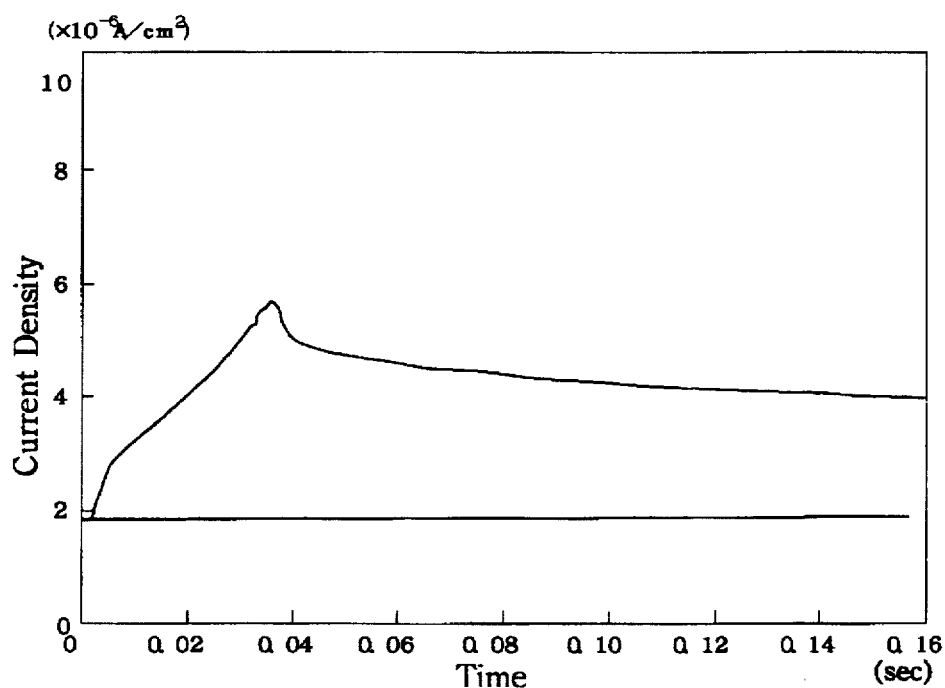
FIG. 16 is a view that illustrates the characteristics of another embodiment of the photoelectric sensor according to the present invention.

The electrical properties of the photoelectric sensor were measured as in Example 1. The results are shown in FIG. 16. According to this photoelectric sensor, the photo-induced current continues to increase all during exposure to light, remains maintained even upon termination of exposure to light, and then decays.

Figure 17:
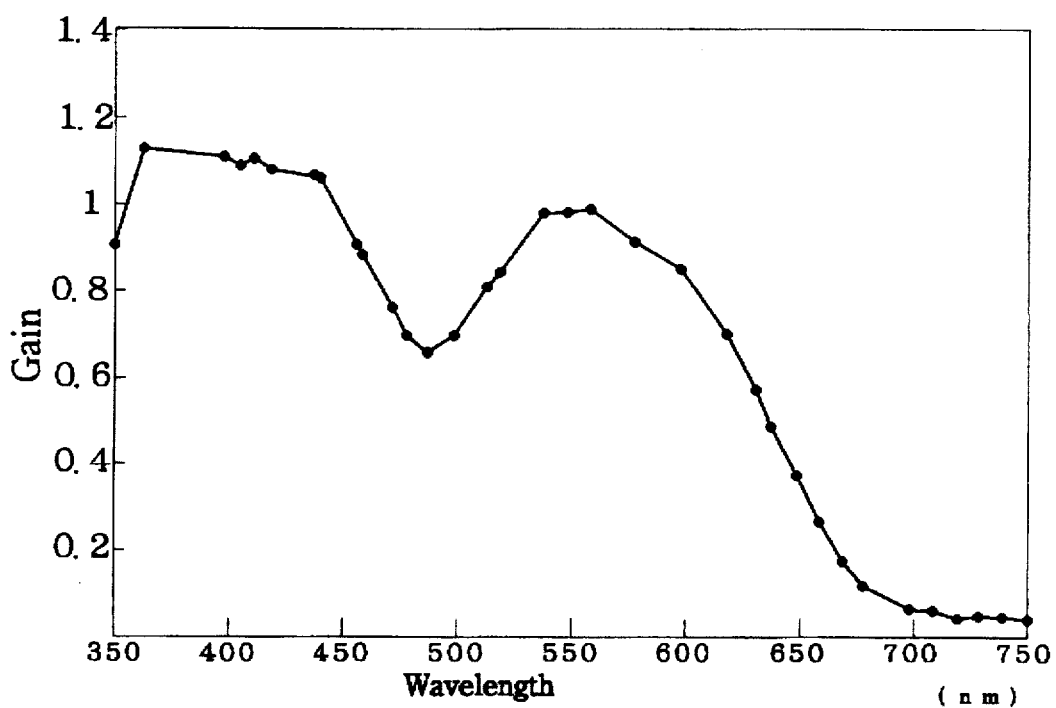
FIG. 17 is a view that illustrates gains at given wavelengths of the photoconductive layer of another embodiment of the photoelectric sensor according to the present invention.

Here assume a gain of 1 is obtained where irradiated with monochromatic light of 560 nm. Gains at given wavelengths are shown in FIG. 17. From these results, it is found that, irrespective of the absorption of the charge generation layer, the sensitivity increases in the blue wavelength region in the vicinity of 420 nm.

(Measurement of Absorption Spectra)

Figure 18:
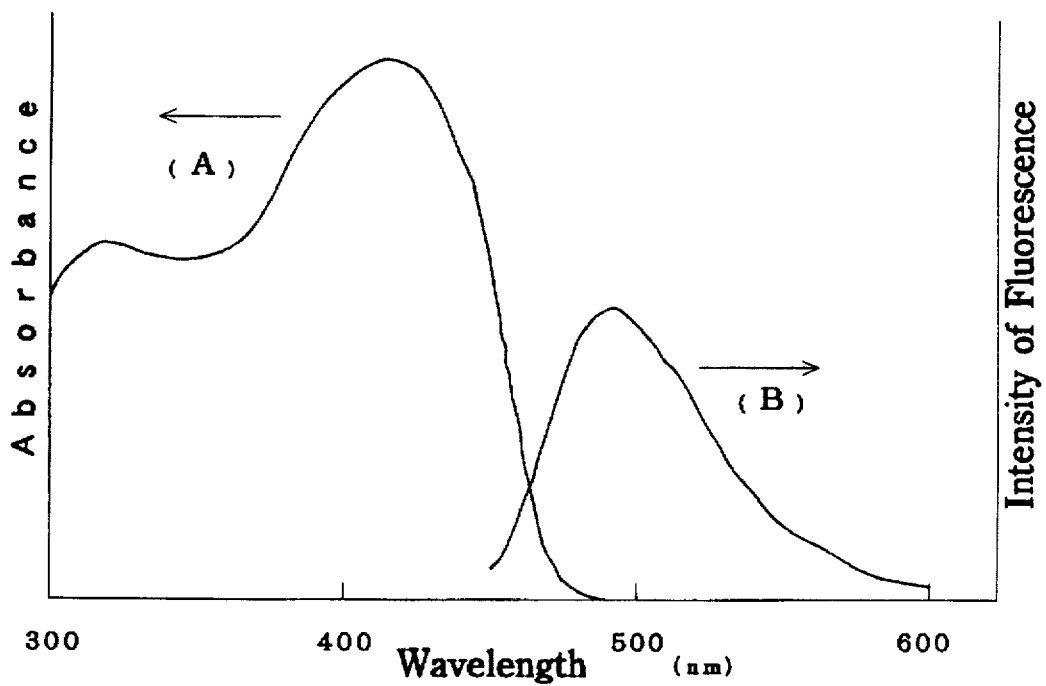
FIG. 18 is a view that illustrates absorption and fluorescence spectra at given wavelengths of the charge transport layer of another embodiment of the photoelectric sensor according to the present invention.

Absorption spectra of the charge transport layer are shown at (A) in FIG. 18. Absorption was found in the vicinity of 416 nm.

(Measurement of Fluorescent Spectra)

Fluorescence spectra of the charge transport layer are shown at (B) in FIG. 18. A fluorescent spectrum of large strength was found in the vicinity of 491 nm at which the charge generation substance shows absorption.

Comparative Example 2

A photoconductive layer was prepared as in Example 1 with the exception that the compound having the following chemical structure was used as the charge generation substance.

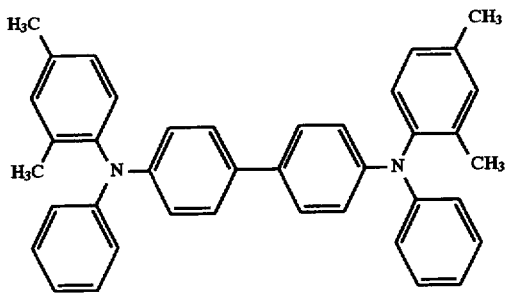

(Electrical Properties of the Photoelectric Sensor)

Figure 19:
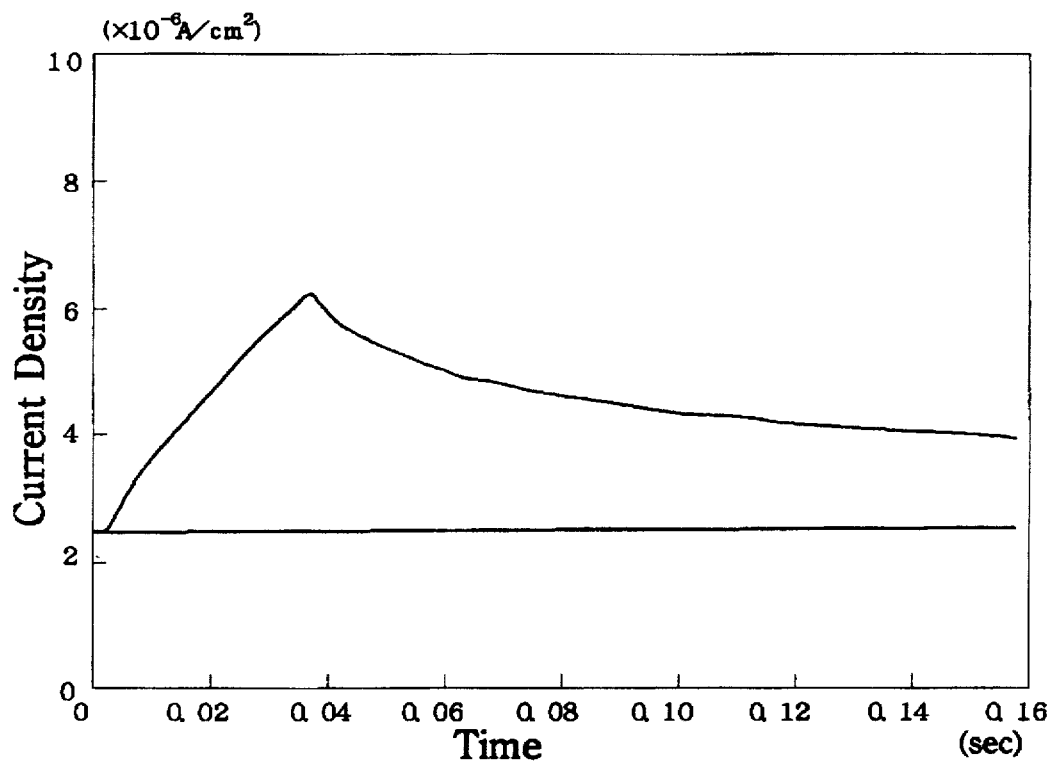
FIG. 19 is a view that illustrates the characteristics of a comparative photoelectric sensor.

The electrical properties of the photoelectric sensor were measured as in Example 1. The results are shown in FIG. 19. According to this photoelectric sensor, the photo-induced current continues to increase all during exposure to light, remains maintained even upon termination of exposure to light, and then decays.

Figure 20:
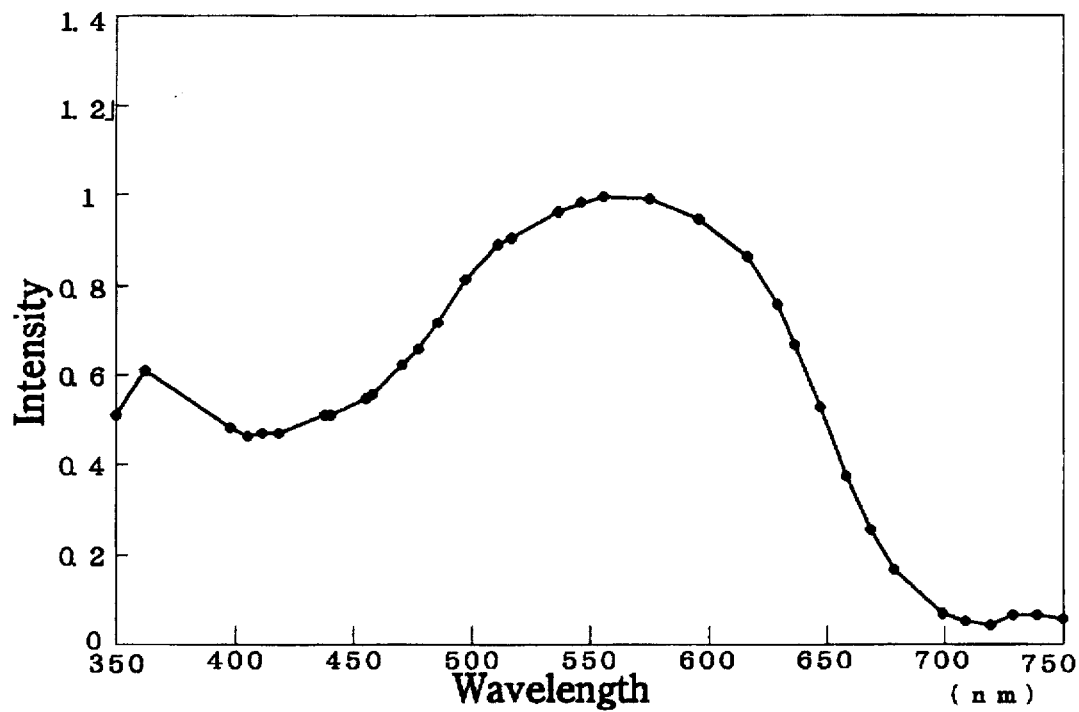
FIG. 20 is a view that illustrates gains at given wavelengths of the photoconductive layer of the comparative photoelectric sensor.

Here assume a gain of 1 is obtained when irradiated with monochromatic light of 560 nm. Gains at given wavelengths are shown in FIG. 20. (Measurement of Absorption Spectra)

Figure 22:
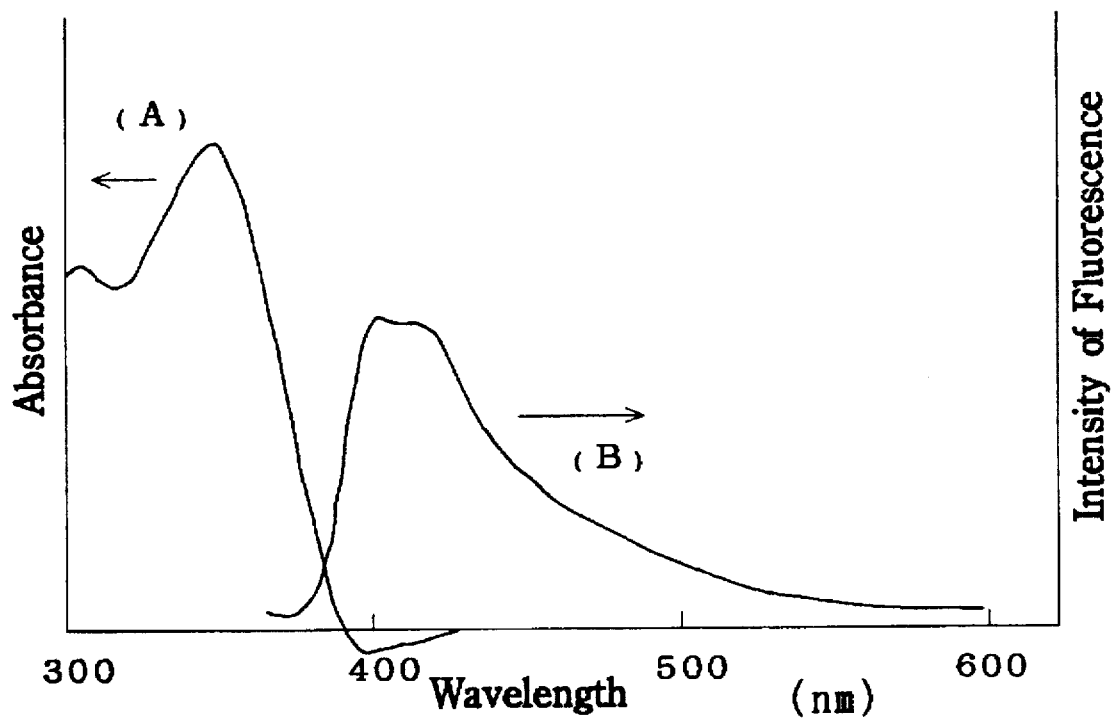
FIG. 22 is a view that illustrates absorption and fluorescence spectra at given wavelengths of the charge transport layer of the comparative photoelectric sensor.

Absorption spectra of the charge generation layer are shown in FIG. 21, and absorption spectra of the charge transport layer are shown at (A) in FIG. 22. It is found that the spectral sensitivity of the photoelectric sensor corresponds to the absorption spectra of the charge generation layer, and is governed by the absorption characteristics of the charge generation substance.

(Measurement of Fluorescent Spectra)

Fluorescent spectra of the charge transport layer are shown at (B) in FIG. 22. The charge transport substance emits strong fluorescence at 400 nm but does not in the wavelength region in which the charge generation substance shows absorption.

EXAMPLE 3

(Preparation of an information recording medium)

On a glass substrate having a thickness of 1.1 mm and an ITO film having a thickness of 100 nm was grown by sputtering, thereby obtaining an electrode. Thereafter, the surface of the electrode was cleaned.

The surface of the electrode was coated with a coating solution by using a blade coater provided with a gap of 50 µm. The coating solution was obtained by uniformly dissolving 40 parts by weight of a multifunctional monomer (dipentaerythritol hexaacrylate, M-400, manufactured by Toa Gosei Chemical Industry Co., Ltd.), 2 parts by weight of a photo-curing initiator (2)-hydroxy-2-methyl-1-phenylpropane-1-one, Darocure 1173, manufactured by Ciba-Geigy Ltd.), 50 parts by weight of a liquid crystal [90% of which was a smectic liquid crystal (S-6, manufactured by Merck & Co., Ltd.) and 10% of which was a nematic liquid crystal (E31LV, manufactured by Merck & Co., Ltd.)], and 3 parts by weight of a surface-active agent (Fluorad FC-430, manufactured by Sumitomo 3M) in 96 parts by weight of xylene. The coating was dried for 3 minutes at 47° C. and then vacuum-dried for 2 minutes at 47° C. Immediately thereafter, the dry coating film was cured by irradiation with ultraviolet rays at 0.3 J/cm$^2$ thereby obtaining an information recording medium having an information recording layer of 6 pm in thickness.

A cross-section of the information recording layer was dried after the liquid crystal had been extracted with hot methanol, and then the internal structure of the information recording layer was observed with a scanning electron microscope having a magnifying power of 1,000 (S-800, manufactured by Hitachi, Ltd.). As a result, it was revealed that the surface of the information recording layer was covered with the ultraviolet curing resin material having a thickness of 0.6 µm and the inside of the layer had a structure in which the liquid crystal phase that formed a continuous layer was filled with the resin particle phase having a particle diameter of 0.1 µm.

(Information recording method and recording characteristics)

The photoelectric sensor and the information recording medium, prepared as described example 1, were disposed to face each other across an air gap defined by a spacer of polyimide film having a thickness of 10 µm.

The stack structure thus obtained was loaded into an imaging camera (RB67 manufactured by Mamiya Camera Co., Ltd.) in place of a photographic filmr as shown in FIG. 7. A DC voltage of 700 V was applied between the respective electrodes of the photoelectric sensor and the information recording medium for 0.04 sec., and at the same time, exposure was carried out by projecting a gray scale from the photoelectric sensor side for 1/30 sec. at an exposure of 2 to 200 lux. After the exposure, the information recording medium was taken out. As a result record regions comprising light-transmitting portions corresponding to the gray scale were observed on the information recording layer. In contrast to a comparative example, the sensitivity was improved to a considerable extent. In addition, the recorded image had no image unevenness or image noise attributable to partial or local unevenness of sensitivity of the photoelectric sensor. Thus, a favorable recorded image was obtained.

Next, the information recorded on the information recording medium was reproduced by an information output system as shown in FIG. 11. In the figure, reference numeral 41 denotes an information recording medium scanner, 42 a personal computer, and 43 a printer.

The information recorded on the information recording medium was read with an image scanner employing a CCD line sensor, and the read information was output by using a sublimation transfer printer (SP-5500 manufactured by Victor Company of Japan, Limited). As a result, a favorable print, which had gradation corresponding to the gray scale was obtained.

Further, a color image was similarly recorded by separating the applied light into three colors, i.e. R, G and B, using prisms and a color filter. When information on the color image thus recorded was read and output in the same way as the above, a favorable print was obtained.

EXAMPLE 4

5 parts by weight of a polyvinyl alcohol (manufactured by Nippon Synthetic Chemical Industry Co. Ltd.; the degree of saponification: 97% to 99%) was dissolved in 95 parts by weight of ion-exchanged water to prepare a coating solution. The coating solution was coated on the photoconductive layer of a photoelectric sensor prepared in the same way as in Example 1 by using a spinner, thereby stacking a dielectric layer of 0.6 µm in thickness on the photoconductive layer.

Next, an information recording layer was formed on the dielectric layer by the same method as that used to form the information recording layer in Example 3. Further, an ITO film was grown on the information recording layer to a thickness of 20 nm by sputtering, thereby stacking an electrically conductive layer on the information recording layer. In this way, an information recording medium was prepared.

A DC voltage of 700 V was applied between the two electrodes of the information recording system, and at the same time, exposure was carried out by projecting a gray scale from the photoelectric sensor side for 1/30 sec at an exposure of 2 to 200 lux in the same way as in Example 1. The voltage application time was 0.05 sec. After the exposure, the information recording medium was taken out, and the recorded information was read and output by an information output system similar to that used in Example 1. As a result, a favorable print was obtained.

According to the present invention as explained above, information can be recorded on the information recording medium, using the photoelectric sensor. Even after termination of exposure to information light, the increased conductivity can be maintained by a continued application of voltage, so that the recording of information on the information recording medium can be continued. By use of the photoelectric sensor having such a great amplifying action and the photoconductive layer to which a fluorescent substance is added, it is possible to record color images well balanced among colors because the sensitivity of the photoconductive layer to blue is improved due to the presence of the fluorescent substance.

What we claim is:

1. A photoelectric sensor in which a photoconductive layer defined by a charge generation layer and a charge transport layer or a photoconductive layer comprising a mixture of a charge generation substance and a charge transport substance is stacked on an electrode, characterized in that said photoconductive layer contains a fluorescent substance as the charge transport substance which emits fluorescence in a wavelength region in which said charge generation substance-containing layer absorbs light.

2. A photoelectric sensor having a photoconductive layer on an electrode and used to form information on an information recording medium, said photoelectric sensor being semiconductive and having such a function that when a voltage is applied between the electrode of said photoelectric sensor and an electrode of said information recording medium while information exposure is being carried out, or when information exposure is carried out with a voltage being applied between the two electrodes, information can be recorded on said information recording medium with an electric current amplified to a level higher than an intensity of a photoelectric current induced by the information exposure, and that even after termination of the information exposure, when the voltage is continuously applied, said photoelectric sensor shows moderately decaying electrical conductivity and continuously effects information recording to said information recording medium, characterized in that said photoconductive layer contains a fluorescent substance as the charge transport substance which emits fluorescence in a wavelength region in which said charge generation substance-containing layer absorbs light.

3. A photoelectric sensor having a photoconductive layer on an electrode and used to form information on an information recording medium having an information recording layer stacked on an electrode so that information can be formed on said information recording layer by an electric field or a quantity of electric charges given thereto from said photoelectric sensor disposed to face said information recording medium, said photoelectric sensor being semiconductive and having such a function that when a voltage is applied between the electrode of said photoelectric sensor and an electrode of said information recording medium while information exposure is being carried out, or when information exposure is carried out with a voltage being applied between the two electrodes, the electric field or the quantity of electric charged given thereto is amplified, and that even after termination of the information exposure, when the voltage is continuously applied, said photoelectric sensor shows moderately decaying electrical conductivity so that the electric field or the quantity of electric charge can subsequently be continuously imparted to said information recording medium, characterized in that said photoconductive layer contains a fluorescent substance as the charge transport substance which emits fluorescence in a wavelength region in which said charge generation substance-containing layer absorbs light.

4. The photoelectric sensor as defined in any one of claims 1 to 3, characterized in that said fluorescent substance has a maximum absorption wavelength in the range of 370 nm to 450 nm, absorbs mainly light lying in the wavelength range of 350 nm to 500 nm, has a maximum fluorescence-emitting wavelength in the range of 470 nm to 550 nm, emits fluorescence in the range of 450 nm to 600 nm, and has action on sensitizing fluorescence.

5. An information recording system for recording light information on an information recording medium by information exposure, said system being characterized by comprising a photoelectric sensor as defined in claim 4, and the information recording medium having an information recording layer formed on an electrode, said photoelectric sensor and said information recording medium being disposed on an optical axis to face each other with a gap located therebetween, so that exposure to light can be carried out from the photoelectric sensor side and an electrical connection can be made between the electrode of said photoelectric sensor and the electrode of said information recording medium so as to apply a voltage therebetween.

6. The information recording system as defined in claim 5, characterized in that said information recording layer comprises a liquid crystal phase and a resin phase.

7. The information recording system as defined in claim 5, characterized in that said information recording layer comprises a thermoplastic resin, and is heated after charges corresponding to information exposure have been imparted to a surface thereof, thereby forming a frost image corresponding to the information exposure on the surface of said information recording layer.

8. The information recording system as defined in claim 5, characterized in that said information recording layer is a charge retaining layer, so that charges corresponding to information exposure are imparted to and formed on a surface of said information recording layer, or the charges formed on the surface of said information recording layer are developed with a toner.

9. The information recording system as defined in claim 5, characterized in that said information recording layer has memory properties.

10. The information recording system as defined in claim 5, characterized in that during the application of an electric field strength of $10^5$ to $10^6$ V/cm to said photoelectric sensor, a current passing through an unexposed portion has a density of $10^{-4}$ to $10^{-7}$ A/cm$^2$, and said information recording medium having said information recording layer comprising at least a liquid crystal phase and a resin phase has a resistivity of $10^{10}$ to $10^{13}$ Ω cm.

11. An information recording system for recording light information on an information recording medium by information exposure, said system being characterized by comprising a photoelectric sensor as defined in claim 4, and the information recording medium having an information recording layer formed on an electrode, said photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω cm.

12. An information recording system including a photoconductive layer, a dielectric layer, an information recording layer and an upper electrode stacked on a lower electrode in the described order, characterized in that a photoelectric sensor part including said lower electrode and said photoconductive layer comprises a photoelectric sensor as defined in claim 4, so that said information recording layer can be exposed to light through said photoelectric sensor part, and an electrical connection is made between said lower and upper electrodes so that a voltage can be applied therebetween.

13. An information recording and reproducing method wherein light information is recorded on an information recording medium by information exposure, said method being characterized by comprising:

using a photoelectric sensor as defined in claim 4, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

14. An information recording and reproducing method wherein light information is recorded on an information recording medium by information exposure, said method being characterized by using a photoelectric sensor as defined in claim 4 and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

15. An information recording and reproducing method wherein light information is recorded on an information recording medium by information exposure, said method being characterized by using a photoelectric sensor as defined in claim 4 and the information recording medium including a charge retaining layer on an electrode, imparting charges onto said information recording layer by light information exposure, and reading and reproducing the thus recorded light information with an electrical potential sensor.

16. An information recording and reproducing method wherein light information is recorded on an information recording medium by information exposure, said method being characterized by using a photoelectric sensor as defined in claim 4 and the information recording medium including a charge retaining layer on an electrode, imparting charges onto said information recording layer by light information exposure, and developing the thus recorded light information with a toner to reproduce said information as visible information by transmitted or reflected light.

17. An information recording and reproducing method wherein light information is recorded on an information recording medium by information exposure, said method being characterized in that said information recording medium includes a photoconductive layer, dielectric layer, an information recording layer and an upper electrode stacked on a lower electrode in the described order; a photoelectric sensor part including said lower electrode and said photoconductive layer comprises a photoelectric sensor as defined in claim 4; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

18. The photoelectric sensor as defined in any one of claims 1 to 3, characterized in that during the application of an electric field strength of $10^6$ to $10^8$ V/cm to said photoelectric sensor, a current passing through an unexposed portion has a density of $10^{-4}$ to $10^{-7}$ A/cm$^2$.

19. An information recording system for recording light information on an information recording medium by information exposure, said system being characterized by comprising a photoelectric sensor as defined in claim 18, and the information recording medium having an information recording layer formed on an electrode, said photoelectric sensor and said information recording medium being disposed on an optical axis to face each other with a gap located therebetween, so that exposure to light can be carried out from the photoelectric sensor side and an electrical connection can be made between the electrode of said photoelectric sensor and the electrode of said information recording medium so as to apply a voltage therebetween.

20. The information recording system as defined in claim 19, characterized in that said information recording layer comprises a liquid crystal phase and a resin phase.

21. The information recording system as defined in claim 19, characterized in that said information recording layer comprises a thermoplastic resin, and is heated after charges corresponding to information exposure have been imparted to a surface thereof, thereby forming a frost image corresponding to the information exposure on the surface of said information recording layer.

22. The information recording system as defined in claim 19, characterized in that said information recording layer is a charge retaining layer, so that charges corresponding to information exposure are imparted to and formed on a surface of said information recording layer, or the charges formed on the surface of said information recording layer are developed with a toner.

23. The information recording system as defined in claim 19, characterized in that said information recording layer has memory properties.

24. The information recording system as defined in claim 19, characterized in that during the application of an electric field strength of $10^5$ to $10^6$ V/cm to said photoelectric sensor, a current passing through an unexposed portion has a density of $10^{-4}$ to $10^{-7}$ A/cm$^2$, and said information recording medium having said information recording layer comprising at least a liquid crystal phase and a resin phase has a resistivity of $10^{10}$ to $10^{13}$ Ω cm.

25. An information recording system for recording light information on an information recording medium by information exposure, said system being characterized by comprising a photoelectric sensor as defined in claim 18, and the information recording medium having an information recording layer formed on an electrode, said photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω cm.

26. An information recording system including a photoconductive layer, a dielectric layer, an information recording layer and an upper electrode stacked on a lower electrode in the described order, characterized in that a photoelectric sensor part including said lower electrode and said photoconductive layer comprises a photoelectric sensor as defined in claim 18, so that said information recording layer can be exposed to light through said photoelectric sensor part, and an electrical connection is made between said lower and upper electrodes so that a voltage can be applied therebetween.

27. An information recording and reproducing method wherein light information is recorded on an information recording medium by information exposure, said method being characterized by comprising:

using a photoelectric sensor as defined in claim 18, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

28. An information recording and reproducing method wherein light information is recorded on an information recording medium by information exposure, said method being characterized by using a photoelectric sensor as defined in claim 18 and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

29. An information recording and reproducing method wherein light information is recorded on an information recording medium by information exposure, said method being characterized by using a photoelectric sensor as defined in claim 18 and the information recording medium including a charge retaining layer on an electrode, imparting charges onto said information recording layer by light information exposure, and reading and reproducing the thus recorded light information with an electrical potential sensor.

30. An information recording and reproducing method wherein light information is recorded on an information recording medium by information exposure, said method being characterized by using a photoelectric sensor as defined in claim 18 and the information recording medium including a charge retaining layer on an electrode, imparting charges onto said information recording layer by light information exposure, and developing the thus recorded light information with a toner to reproduce said information as visible information by transmitted or reflected light.

31. An information recording and reproducing method wherein light information is recorded on an information recording medium by information exposure, said method being characterized in that said information recording medium includes a photoconductive layer, dielectric layer, an information recording layer and an upper electrode stacked on a lower electrode in the described order; a photoelectric sensor part including said lower electrode and said photoconductive layer comprises a photoelectric sensor as defined in claim 18; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

32. The photoelectric sensor as defined in any one of claims 1 to 3, characterized in that said fluorescent substance is a charge transport substance, and during the application of an electric field strength of $10^5$ to $10^6$ V/cm to said photoelectric sensor, a current passing through an unexposed portion has a density of $10^{-4}$ to $10^{-7}$ A/cm$^2$.

33. An information recording system for recording light information on an information recording medium by information exposure, said system being characterized by comprising a photoelectric sensor as defined in claim 32, and the information recording medium having an information recording layer formed on an electrode, said photoelectric sensor and said information recording medium being disposed on an optical axis to face each other with a gap located therebetween, so that exposure to light can be carried out from the photoelectric sensor side and an electrical connection can be made between the electrode of said photoelectric sensor and the electrode of said information recording medium so as to apply a voltage therebetween.

34. The information recording system as defined in claim 33, characterized in that said information recording layer comprises a liquid crystal phase and a resin phase.

35. The information recording system as defined in claim 33, characterized in that said information recording layer comprises a thermoplastic resin, and is heated after charges corresponding to information exposure have been imparted to a surface thereof, thereby forming a frost image corresponding to the information exposure on the surface of said information recording layer.

36. The information recording system as defined in claim 33, characterized in that said information recording layer is a charge retaining layer, so that charges corresponding to information exposure are imparted to and formed on a surface of said information recording layer, or the charges formed on the surface of said information recording layer are developed with a toner.

37. The information recording system as defined in claim 33, characterized in that said information recording layer has memory properties.

38. The information recording system as defined in claim 33, characterized in that during the application of an electric field strength of $10^5$ to $10^6$ V/cm to said photoelectric sensor, a current passing through an unexposed portion has a density of $10^{-4}$ to $10^{-7}$ A/cm$^2$, and said information recording medium having said information recording layer comprising at least a liquid crystal phase and a resin phase has a resistivity of $10^{10}$ to $10^{13}$ Ω cm.

39. An information recording system for recording light information on an information recording medium by information exposure, said system being characterized by comprising a photoelectric sensor as defined in claim 32, and the information recording medium having an information recording layer formed on an electrode, said photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω cm.

40. An information recording system including a photoconductive layer, a dielectric layer, an information recording layer and an upper electrode stacked on a lower electrode in the described order, characterized in that a photoelectric sensor part including said lower electrode and said photoconductive layer comprises a photoelectric sensor as defined in claim 32, so that said information recording layer can be exposed to light through said photoelectric sensor part, and an electrical connection is made between said lower and upper electrodes so that a voltage can be applied therebetween.

41. An information recording and reproducing method wherein light information is recorded on an information recording medium by information exposure, said method being characterized by comprising:

using a photoelectric sensor as defined in claim 32, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

42. An information recording and reproducing method wherein light information is recorded on an information recording medium by information exposure, said method being characterized by using a photoelectric sensor as defined in claim 32 and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

43. An information recording and reproducing method wherein light information is recorded on an information recording medium by information exposure, said method being characterized by using a photoelectric sensor as defined in claim 32 and the information recording medium including a charge retaining layer on an electrode, imparting charges onto said information recording layer by light information exposure, and reading and reproducing the thus recorded light information with an electrical potential sensor.

44. An information recording and reproducing method wherein light information is recorded on an information recording medium by information exposure, said method being characterized by using a photoelectric sensor as defined in claim 32 and the information recording medium including a charge retaining layer on an electrode, imparting charges onto said information recording layer by light information exposure, and developing the thus recorded light information with a toner to reproduce said information as visible information by transmitted or reflected light.

45. An information recording and reproducing method wherein light information is recorded on an information recording medium by information exposure, said method being characterized in that said information recording medium includes a photoconductive layer, dielectric layer, an information recording layer and an upper electrode stacked on a lower electrode in the described order; a photoelectric sensor part including said lower electrode and said photoconductive layer comprises a photoelectric sensor as defined in claim 32; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

46. The photoelectric sensor as defined in any one of claims 1 to 3, characterized in that said fluorescent substance is a charge transport substance having a maximum absorption wavelength in the range of 370 nm to 450 nm, absorbing mainly light lying in the wavelength range of 350 nm to 500 nm, having a maximum fluorescence-emitting wavelength in the range of 470 nm to 550 nm, emitting fluorescence in the range of 450 nm to 600 nm, and having action on sensitizing fluorescence, and during the application of an electric field strength of $10^5$ to $10^6$ V/cm to said photoelectric sensor, a current passing through an unexposed portion has a density of $10^{-4}$ to $10^{-7}$ A/cm$^2$.

47. An information recording system for recording light information on an information recording medium by information exposure, said system being characterized by comprising a photoelectric sensor as defined in claim 46, and the information recording medium having an information recording layer formed on an electrode, said photoelectric sensor and said information recording medium being disposed on an optical axis to face each other with a gap located therebetween, so that exposure to light can be carried out from the photoelectric sensor side and an electrical connection can be made between the electrode of said photoelectric sensor and the electrode of said information recording medium so as to apply a voltage therebetween.

48. The information recording system as defined in claim 47, characterized in that said information recording layer comprises a liquid crystal phase and a resin phase.

49. The information recording system as defined in claim 47, characterized in that said information recording layer comprises a thermoplastic resin, and is heated after charges corresponding to information exposure have been imparted to a surface thereof, thereby forming a frost image corresponding to the information exposure on the surface of said information recording layer.

50. The information recording system as defined in claim 47, characterized in that said information recording layer is a charge retaining layer, so that charges corresponding to information exposure are imparted to and formed on a surface of said information recording layer, or the charges formed on the surface of said information recording layer are developed with a toner.

51. The information recording system as defined in claim 47, characterized in that said information recording layer has memory properties.

52. The information recording system as defined in claim 47, characterized in that during the application of an electric field strength of $10^5$ to $10^6$ V/cm to said photoelectric sensor, a current passing through an unexposed portion has a density of $10^{-4}$ to $10^{-7}$ A/cm$^2$, and said information recording medium having said information recording layer comprising at least a liquid crystal phase and a resin phase has a resistivity of $10^{10}$ to $10^{13}$ Ω cm.

53. An information recording system for recording light information on an information recording medium by information exposure, said system being characterized by comprising a photoelectric sensor as defined in claim 46, and the information recording medium having an information recording layer formed on an electrode, said photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω cm.

54. An information recording system including a photoconductive layer, a dielectric layer, an information recording layer and an upper electrode stacked on a lower electrode in the described order, characterized in that a photoelectric sensor part including said lower electrode and said photoconductive layer comprises a photoelectric sensor as defined in claim 46, so that said information recording layer can be exposed to light through said photoelectric sensor part, and an electrical connection is made between said lower and upper electrodes so that a voltage can be applied therebetween.

55. An information recording and reproducing method wherein light information is recorded on an information recording medium by information exposure, said method being characterized by comprising:

using a photoelectric sensor as defined in claim 46, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

56. An information recording and reproducing method wherein light information is recorded on an information recording medium by information exposure, said method being characterized by using a photoelectric sensor as defined in claim 46 and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

57. An information recording and reproducing method wherein light information is recorded on an information recording medium by information exposure, said method being characterized by using a photoelectric sensor as defined in claim 46 and the information recording medium including a charge retaining layer on an electrode, imparting charges onto said information recording layer by light information exposure, and reading and reproducing the thus recorded light information with an electrical potential sensor.

58. An information recording and reproducing method wherein light information is recorded on an information recording medium by information exposure, said method being characterized by using a photoelectric sensor as defined in claim 46 and the information recording medium including a charge retaining layer on an electrode, imparting charges onto said information recording layer by light information exposure, and developing the thus recorded light information with a toner to reproduce said information as visible information by transmitted or reflected light.

59. An information recording and reproducing method wherein light information is recorded on an information recording medium by information exposure, said method being characterized in that said information recording medium includes a photoconductive layer, dielectric layer, an information recording layer and an upper electrode stacked on a lower electrode in the described order; a photoelectric sensor part including said lower electrode and said photoconductive layer comprises a photoelectric sensor as defined in claim 46; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

60. An information recording system for recording light information on an information recording medium by information exposure, said system being characterized by comprising a photoelectric sensor as defined in any one of claims 1 to 3, and the information recording medium having an information recording layer formed on an electrode, said photoelectric sensor and said information recording medium being disposed on an optical axis to face each other with a gap located therebetween, so that exposure to light can be carried out from the photoelectric sensor side and an electrical connection can be made between the electrode of said photoelectric sensor and the electrode of said information recording medium so as to apply a voltage therebetween.

61. The information recording system as defined in claim 60, characterized in that said information recording layer comprises a liquid crystal phase and a resin phase.

62. The information recording system as defined in claim 60, characterized in that said information recording layer comprises a thermoplastic resin, and is heated after charges corresponding to information exposure have been imparted to a surface thereof, thereby forming a frost image corresponding to the information exposure on the surface of said information recording layer.

63. The information recording system as defined in claim 60, characterized in that said information recording layer is a charge retaining layer, so that charges corresponding to information exposure are imparted to and formed on a surface of said information recording layer, or the charges formed on the surface of said information recording layer are developed with a toner.

64. The information recording system as defined in claim 60, characterized in that said information recording layer has memory properties.

65. The information recording system as defined in claim 60, characterized in that during the application of an electric field strength of $10^5$ to $10^6$ V/cm to said photoelectric sensor, a current passing through an unexposed portion has a density of $10^{-4}$ to $10^{-7}$ A/cm$^2$, and said information recording medium having said information recording layer comprising at least a liquid crystal phase and a resin phase has a resistivity of $10^{10}$ to $10^{13}$ Ω cm.

66. An information recording system for recording light information on an information recording medium by information exposure, said system being characterized by comprising a photoelectric sensor as defined in any one of claims 1 to 3, and the information recording medium having an information recording layer formed on an electrode, said photoelectric sensor and said information recording medium being disposed on an optical axis to face each other with a gap located therebetween, so that exposure to light can be carried out from the photoelectric sensor side and the electrode of said photoelectric sensor and the electrode of said information recording medium can be connected to each other so as to apply a voltage therebetween; during the application of an electric field strength of $10^5$ to $10^6$ V/cm to said photoelectric sensor, a current passing through an unexposed portion has a density of $10^{-4}$ to $10^{-7}$ A/cm$^2$; and said information recording medium has a resistivity of $10^{10}$ to $10^{13}$ Ω cm.

67. An information recording system including a photoconductive layer, a dielectric layer, an information recording layer and an upper electrode stacked on a lower electrode in the described order, characterized in that a photoelectric sensor part including said lower electrode and said photoconductive layer comprises a photoelectric sensor as defined in any one of claims 1 to 3, so that said information recording layer can be exposed to light through said photoelectric sensor part, and an electrical connection is made between said lower and upper electrodes so that a voltage can be applied therebetween.

68. An information recording and reproducing method wherein light information is recorded on an information recording medium by information exposure, said method being characterized by comprising:

using a photoelectric sensor as defined in any one of claims 1 to 3, and the information recording medium having an information recording layer formed on an electrode, at least one of the electrodes of said photoelectric sensor and said information recording medium being transparent; disposing said photoelectric sensor and said information recording medium on an optical axis to face each other with a gap located therebetween; applying a voltage between said two electrodes while carrying out light information exposure, or carrying out light information exposure while applying a voltage between said two electrodes; thereby recording information on said information recording medium, and reproducing the light information recorded on said information recording medium as visible information by transmitted or reflected light.

69. An information recording and reproducing method wherein light information is recorded on an information recording medium by information exposure, said method being characterized by using a photoelectric sensor as defined in any one of claims 1 to 3 and the information recording medium including a thermoplastic resin on an electrode, heating said information recording layer after charges have been formed on thereby by light information exposure, thereby forming a frost image corresponding to the information exposure, and reproducing the light information recorded on said information recording medium as visible information by transmitted or reflected light.

70. An information recording and reproducing method wherein light information is recorded on an information recording medium by information exposure, said method being characterized by using a photoelectric sensor as defined in any one of claims 1 to 3 and the information recording medium including a charge retaining layer on an electrode, imparting charges onto said information recording layer by light information exposure, and reading and reproducing the thus recorded light information with an electrical potential sensor.

71. An information recording and reproducing method wherein light information is recorded on an information recording medium by information exposure, said method being characterized by using a photoelectric sensor as defined in any one of claims 1 to 3 and the information recording medium including a charge retaining layer on an electrode, imparting charges onto said information recording layer by light information exposure, and developing the thus recorded light information with a toner to reproduce said information as visible information by transmitted or reflected light.

72. An information recording and reproducing method wherein light information is recorded on an information recording medium by information exposure, said method being characterized in that said information recording medium includes a photoconductive layer, dielectric layer, an information recording layer and an upper electrode stacked on a lower electrode in the described order; a photoelectric sensor part including said lower electrode and said photoconductive layer comprises a photoelectric sensor as defined in any one of claims 1 to 3; at least one of said lower electrode and said upper electrode is transparent; a voltage is applied between said two electrodes while carrying out light information exposure, or light information exposure is carried out while applying a voltage between said two electrodes; thereby recording information on said information recording medium; and the light information recorded on said information recording medium is reproduced as visible information by transmitted or reflected light.

* * * * *